(12) United States Patent
Green

(10) Patent No.: US 8,698,433 B2
(45) Date of Patent: Apr. 15, 2014

(54) CONTROLLER AND METHOD FOR MINIMIZING PHASE ADVANCE CURRENT

(75) Inventor: Charles E. Green, Fenton, MO (US)

(73) Assignee: Emerson Climate Technologies, Inc., Sidney, OH (US)

( * ) Notice: Subject to any disclaimer, the term of this patent is extended or adjusted under 35 U.S.C. 154(b) by 583 days.

(21) Appl. No.: 12/852,619

(22) Filed: Aug. 9, 2010

(65) Prior Publication Data

US 2011/0031919 A1 Feb. 10, 2011

Related U.S. Application Data

(60) Provisional application No. 61/232,635, filed on Aug. 10, 2009.

(51) Int. Cl.
*H02P 21/00* (2006.01)

(52) U.S. Cl.
USPC ........... 318/400.02; 318/400.01; 318/432; 318/700

(58) Field of Classification Search
USPC .................. 318/400.01, 400.02, 432, 700
See application file for complete search history.

(56) References Cited

U.S. PATENT DOCUMENTS

| | | |
|---|---|---|
| 4,364,237 A | 12/1982 | Cooper et al. |
| 4,370,564 A | 1/1983 | Matsushita |
| 4,428,016 A | 1/1984 | Brasfield |
| 4,662,185 A | 5/1987 | Kobayashi et al. |
| 4,672,298 A | 6/1987 | Rohatyn |
| 4,769,587 A | 9/1988 | Pettigrew |
| 4,866,588 A | 9/1989 | Rene |
| 4,940,929 A | 7/1990 | Williams |
| 5,064,356 A | 11/1991 | Horn |
| 5,187,417 A | 2/1993 | Minnich et al. |
| 5,224,025 A | 6/1993 | Divan et al. |
| 5,320,506 A | 6/1994 | Fogt |
| 5,359,281 A | 10/1994 | Barrow et al. |

(Continued)

FOREIGN PATENT DOCUMENTS

| | | |
|---|---|---|
| CN | 1929290 A | 3/2007 |
| EP | 645589 | 3/1995 |

(Continued)

OTHER PUBLICATIONS

International Search Report regarding Application No. PCT/US2010/045046, mailed Apr. 6, 2011.

(Continued)

*Primary Examiner* — Kawing Chan
(74) *Attorney, Agent, or Firm* — Harness, Dickey & Pierce, P.L.C.

(57) ABSTRACT

A current control module generates a voltage request based on a d-axis current (Idr) demand. A switching control module controls a motor based on the voltage request and generates an out-of-volts (OOV) signal based on a comparison of the voltage request and an available voltage. An Idr injection module generates the Idr demand based on a direct current (DC) bus voltage, a rotational speed, and a demanded torque and selectively applies a first adjustment to the Idr demand. The Idr injection module identifies whether an improvement resulted from the first adjustment, wherein the improvement is identified based on at least one of (i) a measured current of the motor and (ii) the OOV signal. The Idr injection module selectively applies a second adjustment to the Idr demand based on whether the improvement is identified.

18 Claims, 12 Drawing Sheets

(56) References Cited

U.S. PATENT DOCUMENTS

| | | | |
|---|---|---|---|
| 5,371,666 A | 12/1994 | Miller | |
| 5,383,109 A | 1/1995 | Maksimovic et al. | |
| 5,451,832 A | 9/1995 | Cameron et al. | |
| 5,457,375 A | 10/1995 | Marcinkiewicz et al. | |
| 5,461,263 A | 10/1995 | Helfrich | |
| 5,471,117 A | 11/1995 | Ranganath et al. | |
| 5,483,136 A | 1/1996 | Marcinkiewicz | |
| 5,502,370 A | 3/1996 | Hall et al. | |
| 5,502,630 A | 3/1996 | Rokhvarg | |
| 5,511,202 A | 4/1996 | Combs et al. | |
| 5,541,484 A | 7/1996 | DiTucci | |
| 5,563,781 A | 10/1996 | Clauter et al. | |
| 5,565,752 A | 10/1996 | Jansen et al. | |
| 5,576,941 A | 11/1996 | Nguyen et al. | |
| 5,602,465 A | 2/1997 | Clemente | |
| 5,605,053 A | 2/1997 | Otori | |
| 5,606,950 A | 3/1997 | Fujiwara et al. | |
| 5,615,097 A | 3/1997 | Cross | |
| 5,617,013 A | 4/1997 | Cozzi | |
| 5,631,550 A | 5/1997 | Castro et al. | |
| 5,637,974 A | 6/1997 | McCann | |
| 5,656,915 A | 8/1997 | Eaves | |
| 5,682,306 A | 10/1997 | Jansen | |
| 5,742,151 A | 4/1998 | Hwang | |
| 5,742,493 A | 4/1998 | Ito et al. | |
| 5,786,992 A | 7/1998 | Vinciarelli et al. | |
| 5,801,935 A | 9/1998 | Sugden et al. | |
| 5,838,124 A | 11/1998 | Hill | |
| 5,867,379 A | 2/1999 | Maksimovic et al. | |
| 5,917,864 A | 6/1999 | Asahara | |
| 5,949,204 A | 9/1999 | Huggett et al. | |
| 5,955,847 A | 9/1999 | Rothenbuhler | |
| 5,960,207 A | 9/1999 | Brown | |
| 5,970,727 A | 10/1999 | Hiraoka et al. | |
| 5,977,660 A | 11/1999 | Mandalakas et al. | |
| 6,026,006 A | 2/2000 | Jiang et al. | |
| 6,031,751 A | 2/2000 | Janko | |
| 6,041,609 A | 3/2000 | Hornsleth et al. | |
| 6,065,298 A | 5/2000 | Fujimoto | |
| 6,091,215 A | 7/2000 | Lovett et al. | |
| 6,091,233 A | 7/2000 | Hwang et al. | |
| 6,109,048 A | 8/2000 | Kim | |
| 6,116,040 A | 9/2000 | Stark | |
| 6,181,120 B1 | 1/2001 | Hawkes et al. | |
| 6,198,240 B1 | 3/2001 | Notohara et al. | |
| 6,225,767 B1 | 5/2001 | Lovett et al. | |
| 6,232,734 B1 | 5/2001 | Anzai | |
| 6,256,213 B1 | 7/2001 | Illingworth | |
| 6,326,750 B1 | 12/2001 | Marcinkiewicz | |
| 6,366,070 B1 | 4/2002 | Cooke et al. | |
| 6,373,734 B1 | 4/2002 | Martinelli | |
| 6,388,905 B2 | 5/2002 | Nakagawa | |
| 6,392,418 B1 | 5/2002 | Mir et al. | |
| 6,396,229 B1 | 5/2002 | Sakamoto et al. | |
| 6,404,154 B2 | 6/2002 | Marcinkiewicz et al. | |
| 6,411,065 B1 | 6/2002 | Underwood et al. | |
| 6,424,107 B1 * | 7/2002 | Lu | 318/432 |
| 6,429,673 B1 | 8/2002 | Obata et al. | |
| 6,441,580 B2 | 8/2002 | Marcinkiewicz | |
| 6,462,491 B1 | 10/2002 | Iijima et al. | |
| 6,462,974 B1 | 10/2002 | Jadric | |
| 6,467,289 B2 | 10/2002 | Kuroki et al. | |
| 6,483,270 B1 | 11/2002 | Miyazaki et al. | |
| 6,501,240 B2 | 12/2002 | Ueda et al. | |
| 6,523,361 B2 | 2/2003 | Higashiyama | |
| 6,594,158 B2 | 7/2003 | Batarseh et al. | |
| 6,611,117 B1 | 8/2003 | Hardt | |
| 6,619,062 B1 | 9/2003 | Shibamoto et al. | |
| 6,630,806 B1 | 10/2003 | Brits et al. | |
| 6,639,377 B2 | 10/2003 | Iwaji et al. | |
| 6,657,877 B2 * | 12/2003 | Kashima et al. | 363/127 |
| 6,690,137 B2 | 2/2004 | Iwaji et al. | |
| 6,727,668 B1 | 4/2004 | Maslov et al. | |
| 6,731,083 B2 | 5/2004 | Marcinkiewicz | |
| 6,735,284 B2 | 5/2004 | Cheong et al. | |
| 6,756,753 B1 * | 6/2004 | Marcinkiewicz | 318/400.04 |
| 6,756,757 B2 | 6/2004 | Marcinkiewicz et al. | |
| 6,757,185 B2 | 6/2004 | Rojas Romero | |
| 6,771,522 B2 | 8/2004 | Hayashi et al. | |
| 6,772,603 B2 | 8/2004 | Hsu et al. | |
| 6,822,416 B1 | 11/2004 | Kunz et al. | |
| 6,825,637 B2 | 11/2004 | Kinpara et al. | |
| 6,828,751 B2 | 12/2004 | Sadasivam et al. | |
| 6,873,504 B2 | 3/2005 | Lifson et al. | |
| 6,912,142 B2 | 6/2005 | Keim et al. | |
| 6,925,823 B2 | 8/2005 | Lifson et al. | |
| 6,927,553 B2 | 8/2005 | Chen | |
| 6,947,504 B1 | 9/2005 | Pettit | |
| 6,973,794 B2 | 12/2005 | Street et al. | |
| 6,984,948 B2 | 1/2006 | Nakata et al. | |
| 7,000,422 B2 | 2/2006 | Street et al. | |
| 7,042,180 B2 | 5/2006 | Terry et al. | |
| 7,051,542 B2 | 5/2006 | Chen et al. | |
| 7,061,212 B2 | 6/2006 | Phadke | |
| 7,068,016 B2 | 6/2006 | Athari | |
| 7,071,641 B2 | 7/2006 | Arai et al. | |
| 7,088,081 B2 | 8/2006 | Takahashi et al. | |
| 7,088,881 B2 | 8/2006 | Nir | |
| 7,102,305 B2 | 9/2006 | Suzuki | |
| 7,148,664 B2 | 12/2006 | Takahashi et al. | |
| 7,151,359 B2 | 12/2006 | Randall et al. | |
| 7,164,590 B2 | 1/2007 | Li et al. | |
| 7,176,644 B2 | 2/2007 | Ueda et al. | |
| 7,183,734 B2 | 2/2007 | Lassen | |
| 7,193,388 B1 | 3/2007 | Skinner et al. | |
| 7,208,895 B2 | 4/2007 | Marcinkiewicz et al. | |
| 7,262,569 B2 | 8/2007 | Douglas | |
| 7,266,001 B1 | 9/2007 | Notohamiprodjo et al. | |
| 7,295,452 B1 | 11/2007 | Liu | |
| 7,320,225 B2 | 1/2008 | Street et al. | |
| 7,342,379 B2 | 3/2008 | Marcinkiewicz et al. | |
| 7,348,756 B2 | 3/2008 | Ma et al. | |
| 7,352,151 B2 | 4/2008 | Fujitsuna et al. | |
| 7,359,224 B2 | 4/2008 | Li | |
| 7,375,485 B2 | 5/2008 | Shahi et al. | |
| 7,388,340 B2 | 6/2008 | Nojima | |
| 7,392,158 B2 | 6/2008 | Hikawa et al. | |
| 7,403,404 B2 | 7/2008 | Oka et al. | |
| 7,459,874 B2 | 12/2008 | Bae et al. | |
| 7,495,410 B2 | 2/2009 | Zargari et al. | |
| 7,501,776 B2 | 3/2009 | Lee et al. | |
| 7,570,002 B2 | 8/2009 | Peng | |
| 7,583,049 B2 | 9/2009 | Marcinkiewicz et al. | |
| 7,586,286 B2 | 9/2009 | Cheng et al. | |
| 7,591,038 B2 | 9/2009 | Murray et al. | |
| 7,595,613 B2 | 9/2009 | Thompson et al. | |
| 7,615,891 B2 | 11/2009 | Wu et al. | |
| 7,619,385 B2 | 11/2009 | Suzuki et al. | |
| 7,626,349 B2 | 12/2009 | Marcinkiewicz et al. | |
| 7,638,967 B2 | 12/2009 | Aizawa et al. | |
| 7,667,423 B2 | 2/2010 | Shahi et al. | |
| 7,667,986 B2 | 2/2010 | Artusi et al. | |
| 7,675,759 B2 | 3/2010 | Artusi et al. | |
| 7,683,568 B2 | 3/2010 | Pande et al. | |
| 7,688,608 B2 | 3/2010 | Oettinger et al. | |
| 7,694,538 B2 | 4/2010 | Thorn et al. | |
| 7,733,044 B2 | 6/2010 | Nakamura et al. | |
| 7,770,806 B2 | 8/2010 | Herzon et al. | |
| 7,796,389 B2 | 9/2010 | Edmunds et al. | |
| 7,834,573 B2 | 11/2010 | Lindsey et al. | |
| 7,843,155 B2 | 11/2010 | Rozman et al. | |
| 7,854,137 B2 | 12/2010 | Lifson et al. | |
| 7,888,881 B2 | 2/2011 | Shteynberg et al. | |
| 7,898,197 B2 | 3/2011 | Tomigashi | |
| 7,905,122 B2 | 3/2011 | Murray et al. | |
| 7,908,893 B2 | 3/2011 | Thorn et al. | |
| 7,940,020 B2 | 5/2011 | Brown | |
| 7,969,125 B2 | 6/2011 | Melanson | |
| 8,041,524 B2 | 10/2011 | Tan et al. | |
| 8,044,618 B2 | 10/2011 | Nakatsugawa et al. | |
| 8,058,824 B2 | 11/2011 | Williams et al. | |
| 8,058,825 B2 | 11/2011 | Dornhof | |
| 8,089,240 B2 | 1/2012 | Lee | |
| 8,115,428 B2 | 2/2012 | Williams et al. | |

(56) References Cited

U.S. PATENT DOCUMENTS

| | | |
|---|---|---|
| 8,120,298 B2 | 2/2012 | Lelkes |
| 8,146,377 B2 | 4/2012 | Karamanos |
| 8,159,161 B2 | 4/2012 | Tomigashi |
| 8,169,180 B2 | 5/2012 | Hwang et al. |
| 8,188,700 B2 | 5/2012 | Tseng et al. |
| 8,242,727 B2 | 8/2012 | Sultenfuss et al. |
| 8,258,731 B2 | 9/2012 | Shimizu |
| 8,264,192 B2 | 9/2012 | Green et al. |
| 8,264,619 B2 | 9/2012 | Lowe |
| 8,264,860 B2 | 9/2012 | Green |
| 8,294,401 B2 | 10/2012 | Pollock et al. |
| 8,324,768 B2 | 12/2012 | Nakano et al. |
| 8,344,706 B2 | 1/2013 | Green |
| 8,358,098 B2 | 1/2013 | Skinner et al. |
| 8,406,021 B2 | 3/2013 | Green |
| 8,476,873 B2 | 7/2013 | Green |
| 8,493,014 B2 | 7/2013 | Henderson et al. |
| 8,508,166 B2 | 8/2013 | Marcinkiewicz et al. |
| 8,547,051 B2 | 10/2013 | Green et al. |
| 2001/0005320 A1 | 6/2001 | Ueda et al. |
| 2002/0145837 A1 | 10/2002 | Krefta et al. |
| 2002/0149953 A1 | 10/2002 | Smedley et al. |
| 2003/0052640 A1 | 3/2003 | Iwaji et al. |
| 2003/0057912 A1 | 3/2003 | Iwaji et al. |
| 2003/0218444 A1 | 11/2003 | Marcinkiewicz et al. |
| 2004/0211009 A1 | 10/2004 | Murray et al. |
| 2004/0239296 A1 | 12/2004 | Turchi |
| 2004/0257028 A1 | 12/2004 | Schulz et al. |
| 2005/0046370 A1 | 3/2005 | Gallegos-Lopez et al. |
| 2005/0187752 A1 | 8/2005 | Colby et al. |
| 2005/0204482 A1 | 9/2005 | Murray et al. |
| 2005/0253546 A1 | 11/2005 | Dornhof |
| 2006/0013024 A1 | 1/2006 | Temesi et al. |
| 2006/0097688 A1 | 5/2006 | Patel et al. |
| 2006/0125427 A1 | 6/2006 | Kishibe et al. |
| 2006/0130504 A1* | 6/2006 | Agrawal et al. ............ 62/228.4 |
| 2006/0290302 A1 | 12/2006 | Marcinkiewicz et al. |
| 2006/0290304 A1 | 12/2006 | Marcinkiewicz et al. |
| 2007/0120519 A1 | 5/2007 | Sakamoto et al. |
| 2007/0170880 A1 | 7/2007 | Shahi et al. |
| 2008/0002444 A1 | 1/2008 | Shekhawat et al. |
| 2008/0031021 A1 | 2/2008 | Ros et al. |
| 2008/0143289 A1 | 6/2008 | Marcinkiewicz et al. |
| 2008/0185986 A1 | 8/2008 | Marcinkiewicz et al. |
| 2008/0246445 A1 | 10/2008 | Wrathall |
| 2008/0272747 A1 | 11/2008 | Melanson |
| 2008/0278101 A1* | 11/2008 | Shahi et al. ............ 318/400.11 |
| 2008/0284401 A1 | 11/2008 | Oettinger et al. |
| 2008/0304189 A1 | 12/2008 | Tang et al. |
| 2008/0310200 A1 | 12/2008 | Maksimovic et al. |
| 2009/0021208 A1 | 1/2009 | Romenesko et al. |
| 2009/0026999 A1* | 1/2009 | Atarashi ............ 318/720 |
| 2009/0122582 A1 | 5/2009 | Ye et al. |
| 2009/0153113 A1 | 6/2009 | Zilberberg |
| 2009/0160254 A1 | 6/2009 | Wu et al. |
| 2009/0174262 A1 | 7/2009 | Martin et al. |
| 2009/0243561 A1 | 10/2009 | Tan et al. |
| 2009/0303764 A1 | 12/2009 | Jin et al. |
| 2010/0066283 A1* | 3/2010 | Kitanaka ............ 318/400.02 |
| 2010/0080026 A1 | 4/2010 | Zhang |
| 2010/0246228 A1 | 9/2010 | Kazlauskas |
| 2010/0292943 A1 | 11/2010 | Minor et al. |
| 2010/0301787 A1* | 12/2010 | Gallegos-Lopez et al. ............ 318/400.02 |
| 2010/0301788 A1* | 12/2010 | Chen et al. ............ 318/400.3 |
| 2011/0031920 A1 | 2/2011 | Henderson et al. |
| 2011/0031943 A1 | 2/2011 | Green |
| 2011/0075462 A1 | 3/2011 | Wildash |
| 2011/0127938 A1 | 6/2011 | Kawakami et al. |
| 2011/0156619 A1 | 6/2011 | Nomura |
| 2011/0175560 A1 | 7/2011 | Akiyama |
| 2012/0206077 A1 | 8/2012 | Yoneshima et al. |

FOREIGN PATENT DOCUMENTS

| | | |
|---|---|---|
| EP | 2276157 A1 | 1/2011 |
| EP | 2381568 A2 | 10/2011 |
| JP | 08249067 A | 9/1996 |
| JP | 09062363 A | 3/1997 |
| JP | 09308283 A | 11/1997 |
| JP | 2000044135 A | 2/2000 |
| JP | 2000199780 A | 7/2000 |
| JP | 2002199780 A | 7/2002 |
| JP | 2003018704 A | 1/2003 |
| JP | 2004112942 A | 4/2004 |
| JP | 2007259686 A | 10/2007 |
| KR | 19980080006 A | 6/2002 |
| KR | 20060009199 A | 1/2006 |
| KR | 20060129272 A | 12/2006 |
| KR | 20070064726 A | 6/2007 |
| KR | 20080060290 A | 7/2008 |

OTHER PUBLICATIONS

Written Opinion of the International Searching Authority regarding Application No. PCT/US2010/045046, mailed Apr. 6, 2011.

International Search Report regarding Application No. PCT/US2010/045041, mailed Feb. 22, 2011.

Written Opinion of the International Searching Authority regarding Application No. PCT/US2010/045041, mailed Feb. 22, 2011.

Notice of Allowance and Fees Due regarding U.S. Appl. No. 12/852,625, dated Mar. 15, 2012.

International Search Report regarding Application No. PCT/US2010/044982, mailed Feb. 23, 2011.

Written Opinion of the International Searching Authority regarding Application No. PCT/US2010/044982, mailed Feb. 23, 2011.

International Seach Report regarding Application No. PCT/US2010/044991, mailed Apr. 22, 2011.

Written Opinion of the International Searching Authority regarding Application No. PCT/US2010/044991, mailed Apr. 22, 2011.

International Search Report regarding Application No. PCT/US2010/044993, mailed Apr. 25, 2011.

Written Opinion of the International Searching Authority regarding Application No. PCT/US2010/044993, mailed Apr. 25, 2011.

International Search Report regarding Application No. PCT/US2010/044998, Apr. 21, 2011.

Written Opinion of the International Searching Authority regarding Application No. PCT/US2010/044998, mailed Apr. 21, 2011.

Written Opinion of the International Searching Authority regarding Application No. PCT/US2010/045005, mailed Apr. 25, 2011.

International Search Report regarding Application No. PCT/US2010/045005, mailed Apr. 25, 2011.

Written Opinion of the International Searching Authority regarding Application No. PCT/US2010/045025, mailed Apr. 18, 2011.

International Search Report regarding Application No. PCT/US2010/045025, mailed Apr. 18, 2011.

International Search Report regarding Application No. PCT/US2010/045032, mailed Apr. 25, 2011.

Written Opinion of the International Searching Authority regarding Application No. PCT/US2010/045032, mailed Apr. 25, 2011.

"Power-Factor Correction with Interieved Boost Converters in Continuous-Inductor-Current Mode," Laszlo Balogh and Richard Redl, IEEE 1993.

"Advantages of Interleaved Boost Converters for PFC," Michael O'Loughlin, Texas Instruments, Mar. 30, 2006.

"2nd Generation of PFC Solutions," Michael Frisch, Temesi Erno, Yu Jinghui, Tyco Electronics/Power Systems, Sep. 2004.

Notice of Allowance and Fee(s) Due and Notice of Allowability regarding U.S. Appl. No. 12/852,549, dated Apr. 2, 2012.

"Real-Time Computer Control: An Introduction," Bennett, S., Prentice Hall International (UK) Ltd., Chapter 2 (pp. 19-47) and Chapter 4 (pp. 99-128), 1988.

Notice of Allowance regarding U.S. Appl. No. 12/852,585, dated Aug. 28, 2012.

Notice of Allowance and Fee(s) Due regarding U.S. Appl. No. 12/852,553, dated Sep. 21, 2012.

(56) References Cited

OTHER PUBLICATIONS

Office Action regarding U.S. Appl. No. 12/852,565, dated Oct. 15, 2012.

Baggio, J.E., et al., "Discrete control for three-level boost PFC converter," Telecommunications Energy Conference, 2002. INTELEC. 24th Annual International, pp. 627-633,2002. doi: 10.1109/INTLEC. 2002.1048772; URL: http://ieeexplore.ieee.org/stamp/stamp.jsp?tp=&arnumber=1048722&isnumber=22440.

Notice of Allowance and Fee(s) Due regarding U.S. Appl. No. 12/852,578, dated Nov. 23, 2012.

Non-Final Office Action regarding U.S. Appl. No. 12/852,557, dated Jan. 3, 2013.

Laszlo Huber et al. "Performance Evaluation of Bridgeless PFC Boost Rectifiers." Delta Products Corporation. Power Electronics Laboratory. Applied Power Electronics Conference. APEC 2007— Twenty Second Annual IEEE, IEEE, Pl. Feb. 1, 2007. pp. 165-171.

Extended European Search Report regarding Application No. 10808617.4-1242 / 2465187, dated Jan. 30, 2013.

U.S. Appl. No. 12/852,961, filed Aug. 9, 2010, Henderson et al.

U.S. Appl. No. 12/852,557, filed Aug. 9, 2010, Marcinkiewicz et al.

U.S. Appl. No. 12/852,565, filed Aug. 9, 2010, Green.

Notice of Allowance and Fee(s) Due regarding U.S. Appl. No. 12/852,565, dated Mar. 4, 2013.

Notice of Allowance and Fee(s) Due regarding U.S. Appl. No. 12/852,961, dated Mar. 8, 2013.

Notice of Grounds for Rejection regarding Korean Patent Application No. 10-2012-7006210. dated Mar. 22, 2013, Translation provided by Y.S. Chang & Associates.

Korean Decision for Patent Grant regarding Application No. 10-2012-7006166, dated Jun. 26, 2013. Translation provided by Y.S. Chang & Associates.

Notification of Grounds for Refusal regarding Korean Patent Application No. 10-2012-7006277, dated Jul. 23, 2013. Translation provided by Y.S. Chang & Associates.

Song Dan; Shanghia University; The air conditioning compressor drive sensorless permanent magnet synchronous motor vector control method; Mar. 2008; 26 pages.

First Office Action from the State Intellectual Property Office from People's Republic of China regarding Chinese Patent Application No. 201080045534.6, dated Feb. 8, 2014. Translation provided by Unitalen Attorneys at Law.

* cited by examiner

CONTROLLER AND METHOD FOR MINIMIZING PHASE ADVANCE CURRENT

CROSS-REFERENCE TO RELATED APPLICATIONS

This application claims the benefit of U.S. Provisional Application No. 61/232,635, filed on Aug. 10, 2009. The entire disclosure of the above application is incorporated herein by reference.

FIELD

The present disclosure relates to electric motor control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric motors are used in a wide variety of industrial and residential applications including, but not limited to, heating, ventilating, and air conditioning (HVAC) systems. For example only, an electric motor may drive a compressor in an HVAC system. One or more additional electric motors may also be implemented in the HVAC system. For example only, the HVAC system may include another electric motor that drives a fan associated with a condenser. Another electric motor may be included in the HVAC system to drive a fan associated with an evaporator.

Power factor is an indicator of the relationship between current and voltage in a circuit, or how effectively a circuit uses real power compared to storing and returning energy to the power source. Power factor may be expressed as a value between zero and one. The circuit's use of actual real power divided by the total volt amps drawn by the circuit may increase as the power factor approaches one. In various implementations, a power factor correction (PFC) system may be implemented. PFC systems generally operate to increase a circuit's power factor toward one, thereby increasing the circuit's use of real power as compared with the amount of reactive power the circuit stores and returns to the source.

SUMMARY

A current control module generates a voltage request based on a d-axis current (Idr) demand. A switching control module controls a motor based on the voltage request and generates an out-of-volts (OOV) signal based on a comparison of the voltage request and an available voltage. An Idr injection module generates the Idr demand based on a direct current (DC) bus voltage, a rotational speed, and a demanded torque and selectively applies a first adjustment to the Idr demand. The Idr injection module identifies whether an improvement resulted from the first adjustment, wherein the improvement is identified based on at least one of (i) a measured current of the motor and (ii) the OOV signal. The Idr injection module selectively applies a second adjustment to the Idr demand based on whether the improvement is identified.

In other features, the improvement is identified when the measured current after the first adjustment is less than the measured current before the first adjustment.

In still other features, the improvement is identified when the OOV signal before the first adjustment is greater than a predetermined limit and the OOV signal after the first adjustment is less than the OOV signal before the first adjustment.

In further features, the improvement is identified when all of the following are true: (i) the OOV signal before the first adjustment is less than the predetermined limit, (ii) the OOV signal after the first adjustment is less than predetermined limit, and (iii) the measured current after the first adjustment is less than the measured current before the first adjustment.

In still further features, when the improvement is identified, the Idr injection module applies the second adjustment in a same direction as the first adjustment. When the improvement is not identified, the Idr injection module applies the second adjustment in an opposite direction of the first adjustment.

In other features, when the improvement is not identified, the Idr injection module removes the first adjustment before applying the second adjustment.

In still other features, the Idr injection module determines a base demand, selectively modifies an adjust value by applying the first and second adjustments, and generates the Idr demand by adding the adjust value to the base demand.

In further features, the Idr injection module determines the base demand from a lookup table based on the DC bus voltage, the rotational speed, and the demanded torque, wherein the rotational speed is a commanded speed of the motor.

In still further features, when reset conditions are present, the Idr injection module resets the adjust value to zero, stores the rotational speed, and stores the DC bus voltage. The reset conditions include at least one of: the OOV signal is greater than a first predetermined value, a magnitude of a difference between the rotational speed and the stored value of the rotational speed is greater than a second predetermined value, and a magnitude of a difference between the DC bus voltage and the stored value of the DC bus voltage is greater than a third predetermined value.

In other features, The system of claim 1 wherein the switching control module: sets an OOV flag to a first value when the voltage request is greater than an upper limit based on the available voltage; sets the OOV flag to a second value when the voltage request is less than the upper limit; and generates the OOV signal based on an average of the OOV flag.

A method includes: generating a d-axis current (Idr) demand based on a direct current (DC) bus voltage, a rotational speed, and a demanded torque; generating a voltage request based on the Idr demand; generating an out-of-volts (OOV) signal based on a comparison of the voltage request and an available voltage; controlling a motor based on the voltage request; selectively applying a first adjustment to the Idr demand; identifying whether an improvement resulted from the first adjustment, wherein the improvement is identified based on at least one of (i) a measured current of the motor and (ii) the OOV signal; and selectively applying a second adjustment to the Idr demand based on whether the improvement is identified.

In other features, the improvement is identified when the measured current after the first adjustment is less than the measured current before the first adjustment.

In still other features, the improvement is identified when the OOV signal before the first adjustment is greater than a predetermined limit and the OOV signal after the first adjustment is less than the OOV signal before the first adjustment.

In further features, the improvement is identified when all of the following are true: (i) the OOV signal before the first adjustment is less than the predetermined limit, (ii) the OOV signal after the first adjustment is less than predetermined limit, and (iii) the measured current after the first adjustment is less than the measured current before the first adjustment.

In still further features, the method further includes: when the improvement is identified, applying the second adjustment in a same direction as the first adjustment; and when the improvement is not identified, applying the second adjustment in an opposite direction of the first adjustment.

In other features, the method further includes: determining a base demand; selectively modifying an adjust value by applying the first and second adjustments; and generating the Idr demand by adding the adjust value to the base demand.

In still other features, the method further includes determining the base demand from a lookup table based on the DC bus voltage, the rotational speed, and the demanded torque, and wherein the rotational speed is a commanded speed of the motor.

In further features, the method further includes, when reset conditions are present, resetting the adjust value to zero, storing the rotational speed, and storing the DC bus voltage, wherein the reset conditions include at least one of: the OOV signal is greater than a first predetermined value, a magnitude of a difference between the rotational speed and the stored value of the rotational speed is greater than a second predetermined value, and a magnitude of a difference between the DC bus voltage and the stored value of the DC bus voltage is greater than a third predetermined value.

In still further features, the method further includes: setting an OOV flag to a first value when the voltage request is greater than an upper limit based on the available voltage; setting the OOV flag to a second value when the voltage request is less than the upper limit; and generating the OOV signal based on an average of the OOV flag.

A method of controlling a motor includes determining a base demand from a lookup table based on a direct current (DC) bus voltage, a commanded speed, and a demanded torque. The method includes generating a d-axis current (Idr) demand by adding an adjust value to the base demand. The method includes generating a voltage request based on the Idr demand. The method includes setting an out-of-volts (OOV) flag to a first value when the voltage request is greater than an upper limit, wherein the upper limit is based on the DC bus voltage. The method includes setting the OOV flag to a second value when the voltage request is less than the upper limit. The method includes generating an OOV signal by averaging the OOV flag. The method includes controlling a motor based on the voltage request. The method includes selectively applying a first adjustment to the adjust value. The method includes identifying whether an improvement resulted from the first adjustment, wherein the improvement is identified when at least one of: both of the following are true: (i) the OOV signal before the first adjustment is greater than a predetermined limit and (ii) the OOV signal after the first adjustment is less than the OOV signal before the first adjustment; or all of the following are true: (i) the OOV signal before the first adjustment is less than the predetermined limit, (ii) the OOV signal after the first adjustment is less than predetermined limit, and (iii) a measured current after the first adjustment is less than the measured current before the first adjustment. The method includes, when the improvement is identified, applying a second adjustment to the adjust value in a same direction as the first adjustment. The method includes, when the improvement is not identified, applying the second adjustment to the adjust value in an opposite direction of the first adjustment. The method includes, when reset conditions are present, resetting the adjust value to zero, storing the commanded speed, and storing the DC bus voltage, wherein the reset conditions include at least one of: the OOV signal is greater than a first predetermined value, a magnitude of a difference between the commanded speed and the stored value of the commanded speed is greater than a second predetermined value, and a magnitude of a difference between the DC bus voltage and the stored value of the DC bus voltage is greater than a third predetermined value.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
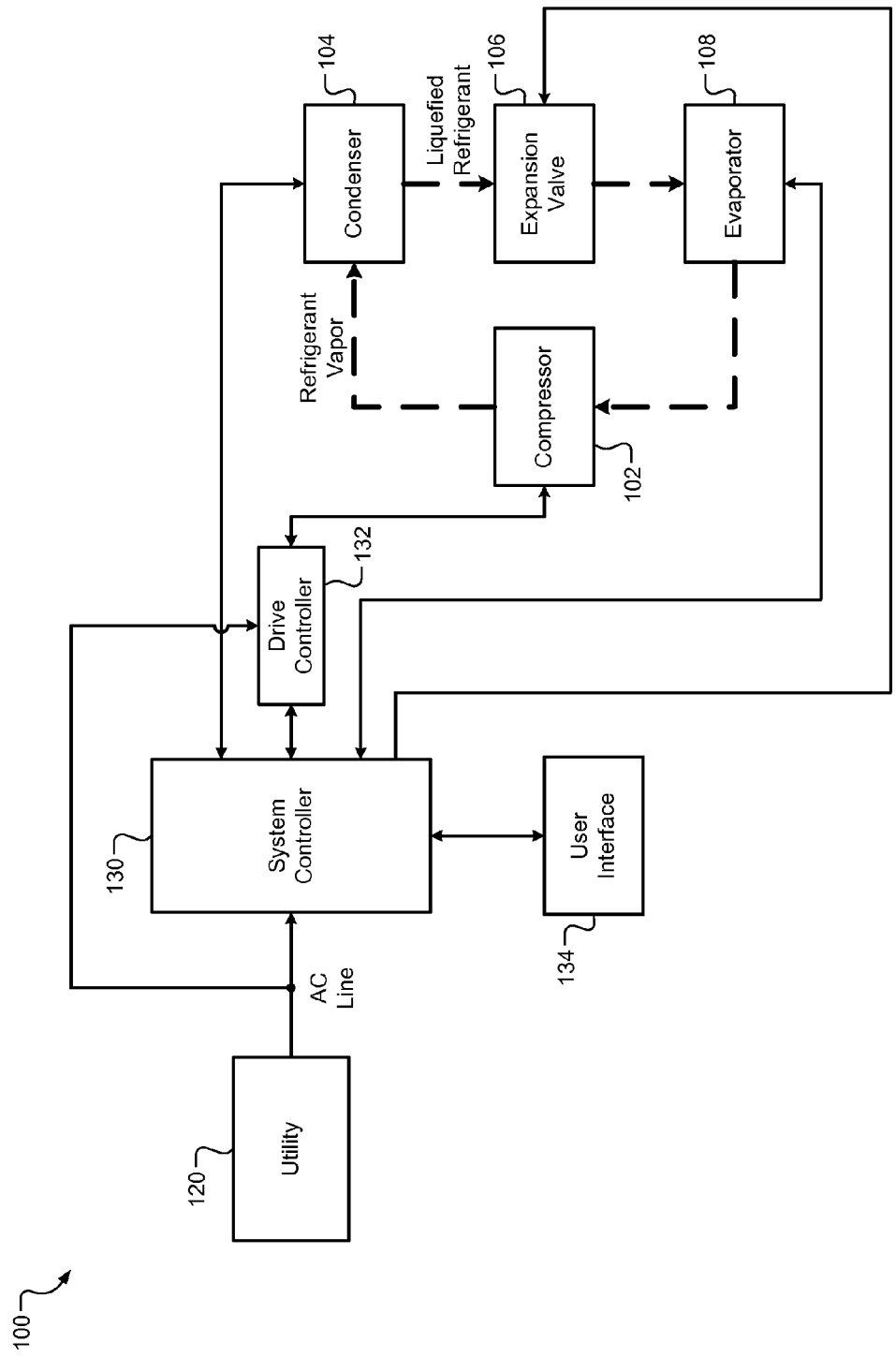
FIG. 1 is a functional block diagram of an example refrigeration system.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Referring now to FIG. 1, a functional block diagram of a refrigeration system 100 is presented. The refrigeration system 100 may include a compressor 102, a condenser 104, an expansion valve 106, and an evaporator 108. According to the principles of the present disclosure, the refrigeration system 100 may include additional and/or alternative components. In addition, the present disclosure is applicable to other suitable types of refrigeration systems including, but not limited to, heating, ventilating, and air conditioning (HVAC), heat pump, refrigeration, and chiller systems.

The compressor 102 receives refrigerant in vapor form and compresses the refrigerant. The compressor 102 provides pressurized refrigerant in vapor form to the condenser 104. The compressor 102 includes an electric motor that drives a pump. For example only, the pump of the compressor 102 may include a scroll compressor and/or a reciprocating compressor.

All or a portion of the pressurized refrigerant is converted into liquid form within the condenser 104. The condenser 104 transfers heat away from the refrigerant, thereby cooling the refrigerant. When the refrigerant vapor is cooled to a temperature that is less than a saturation temperature, the refrigerant transforms into a liquid (or liquefied) refrigerant. The condenser 104 may include an electric fan that increases the rate of heat transfer away from the refrigerant.

The condenser 104 provides the refrigerant to the evaporator 108 via the expansion valve 106. The expansion valve 106 controls the flow rate at which the refrigerant is supplied to the evaporator 108. The expansion valve 106 may include a thermostatic expansion valve or may be controlled electronically by, for example, a system controller 130. A pressure drop caused by the expansion valve 106 may cause a portion of the liquefied refrigerant to transform back into the vapor form. In this manner, the evaporator 108 may receive a mixture of refrigerant vapor and liquefied refrigerant.

The refrigerant absorbs heat in the evaporator 108. Liquid refrigerant transitions into vapor form when warmed to a temperature that is greater than the saturation temperature of the refrigerant. The evaporator 108 may include an electric fan that increases the rate of heat transfer to the refrigerant.

A utility 120 provides power to the refrigeration system 100. For example only, the utility 120 may provide single-phase alternating current (AC) power at approximately 230 Volts (V) root mean squared (RMS) or at another suitable voltage. In various implementations, the utility 120 may provide three-phase power at approximately 400 Volts RMS or 480 Volts RMS at a line frequency of, for example, 50 or 60 Hz. The utility 120 may provide the AC power to the system controller 130 via an AC line. The AC power may also be provided to a drive controller 132 via the AC line.

The system controller 130 controls the refrigeration system 100. For example only, the system controller 130 may control the refrigeration system 100 based on user inputs and/or parameters measured by various sensors (not shown). The sensors may include pressure sensors, temperature sensors, current sensors, voltage sensors, etc. The sensors may also include feedback information from the drive control, such as motor currents or torque, over a serial data bus or other suitable data buses.

A user interface 134 provides user inputs to the system controller 130. The user interface 134 may additionally or alternatively provide the user inputs to the drive controller 132. The user inputs may include, for example, a desired temperature, requests regarding operation of a fan (e.g., the evaporator fan), and/or other suitable inputs. The system controller 130 may control operation of the fans of the condenser 104, the evaporator 108, and/or the expansion valve 106.

The drive controller 132 may control the compressor 102 based on commands from the system controller 130. For example only, the system controller 130 may instruct the drive controller 132 to operate the compressor motor at a certain speed. In various implementations, the drive controller 132 may also control the condenser fan.

Figure 2:
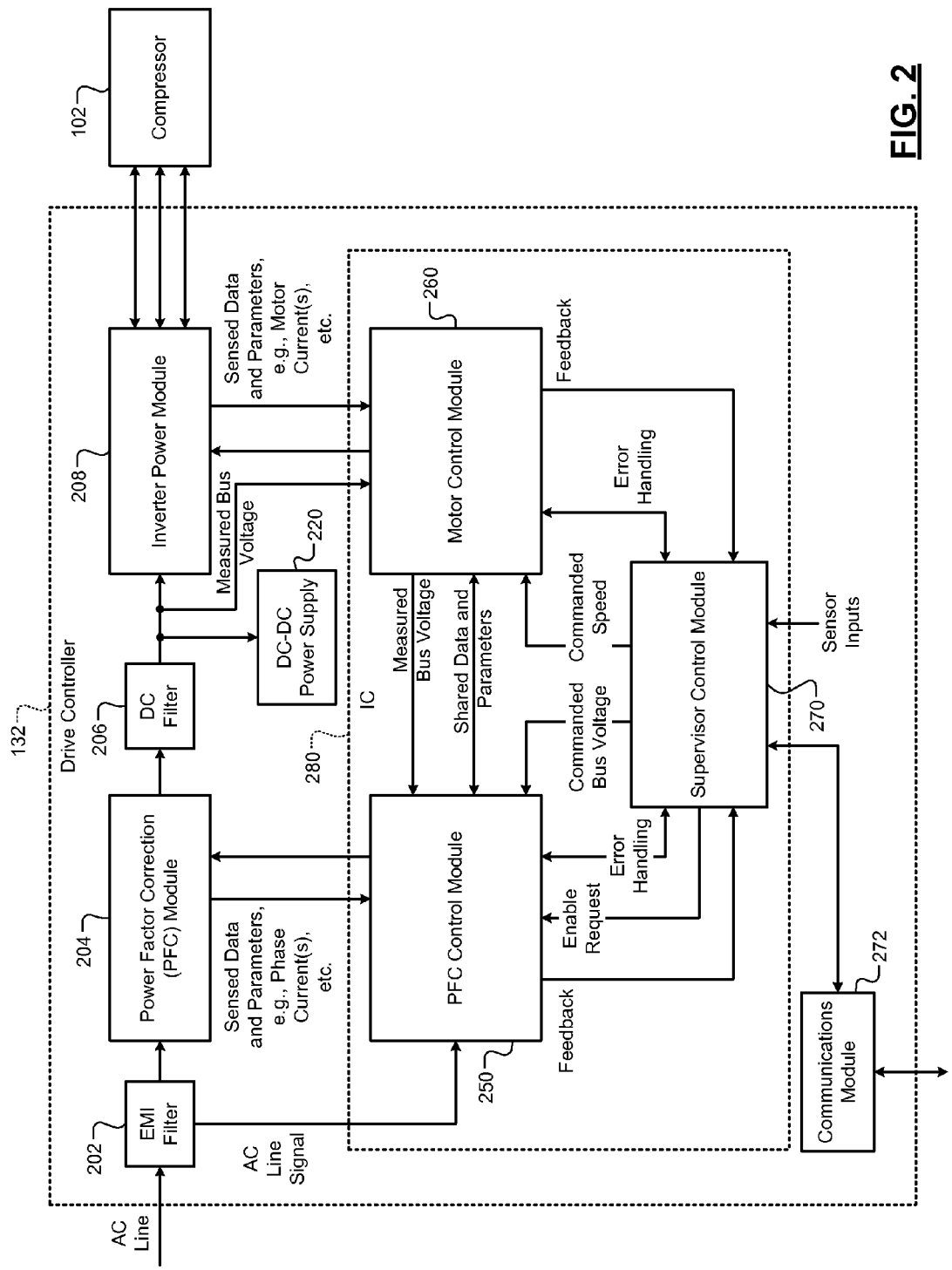
FIG. 2 is a functional block diagram of an example drive controller and an example compressor.

Referring now to FIG. 2, a functional block diagram of the drive controller 132 and the compressor 102 is presented. An electromagnetic interference (EMI) filter 202 reduces EMI that might otherwise be injected back onto the AC line by the drive controller 132. The EMI filter 202 may also filter EMI carried on the AC line.

A power factor correction (PFC) module 204 receives AC power from the AC line as filtered by the EMI filter 202. The PFC module 204 (described in more detail with reference to FIGS. 3a, 3b, and 3c) rectifies the AC power, thereby converting the AC input power into direct current (DC) power. The generated DC power is provided at positive and negative terminals of the PFC module 204. The PFC module 204 also selectively provides power factor correction between the input AC power and the generated DC power.

The PFC module 204 selectively boosts the AC power to a DC voltage that is greater than a peak voltage of the AC power. For example only, the PFC module 204 may operate in a passive mode, where the DC voltage generated is less than a peak voltage of the AC power. The PFC module 204 may also operate in an active mode, where the DC voltage generated is greater than the peak voltage of the AC power. A DC voltage that is greater than the peak voltage of the AC power may be referred to as a boosted DC voltage.

AC power having an RMS voltage of 230 V has a peak voltage of approximately 325 V (230 V multiplied by the square root of 2). For example only, when operating from AC power having an RMS voltage of 230 V, the PFC module 204 may generate boosted DC voltages between approximately 350 V and approximately 410 V. For example only, the lower limit of 350 V may be imposed to avoid unstable operating regimes of the PFC module 204. The limits may vary, such as with the actual AC input voltage value. In various implementations, the PFC module 204 may be able to achieve higher boosted DC voltages than 410 V. However, the upper limit may be imposed to improve long-term reliability of components that would experience greater stress at higher voltages, such as components in a DC filter 206. In various implementations, the upper and/or lower limits may be varied.

The DC filter 206 filters the DC power generated by the PFC module 204. The DC filter 206 minimizes ripple voltage present in the DC power that results from the conversion of AC power to DC power. In various implementations, the DC filter 206 may include one or more series or parallel filter capacitors connected between the positive and negative terminals of the PFC module 204. In such implementations, the positive and negative terminals of the PFC module 204 may be connected directly to positive and negative terminals of an inverter power module 208.

The inverter power module 208 (described in more detail with reference to FIGS. 4a, 4b, and 4c) converts the DC power, as filtered by the DC filter 206, into AC power that is provided to the compressor motor. For example only, the inverter power module 208 may convert the DC power into three-phase AC power and provide the phases of the AC power to three respective windings of the motor of the compressor 102. In other implementations, the inverter power module 208 may convert the DC power into more or fewer phases of power.

A DC-DC power supply 220 may also receive the filtered DC power. The DC-DC power supply 220 converts the DC power into one or more DC voltages that are suitable for various components and functions. For example only, the DC-DC power supply 220 may reduce the voltage of the DC power to a first DC voltage that is suitable for powering digital logic and a second DC voltage that is suitable for controlling switches within the PFC module 204. For example only, the second DC voltage may be selectively applied to gate terminals of the switches. In various implementations, DC power may be provided by another DC power source (not shown)— for example, a DC voltage derived via a transformer from the main 230 VAC input.

In various implementations, the first DC voltage may be approximately 3.3 V and the second DC voltage may be approximately 15 V. In various implementations, the DC-DC power supply 220 may also generate a third DC voltage. For example only, the third DC voltage may be approximately 1.2 V. The third DC voltage may be derived from the first DC voltage using a voltage regulator. For example only, the third DC voltage may be used for core digital logic and the first DC voltage may be used for input/output circuitry of a PFC control module 250 and a motor control module 260.

The PFC control module 250 controls the PFC module 204, and the motor control module 260 controls the inverter power module 208. In various implementations, the PFC control module 250 controls switching of the switches within the PFC module 204, and the motor control module 260 controls switching of switches within the inverter power module 208. The PFC module 204 may be implemented with 1, 2, 3, or more phases.

A supervisor control module 270 may communicate with the system controller 130 via a communications module 272. The communications module 272 may include an input/output port and other suitable components to serve as an interface between the system controller 130 and the supervisor control module 270. The communications module 272 may implement wired and/or wireless protocols.

The supervisor control module 270 provides various commands to the PFC control module 250 and the motor control module 260. For example, the supervisor control module 270 may provide a commanded speed to the motor control module 260. The commanded speed corresponds to a desired rotational speed of the motor of the compressor 102.

In various implementations, the commanded compressor speed may be provided to the supervisor control module 270 by the system controller 130. In various implementations, the supervisor control module 270 may determine or adjust the commanded compressor speed based on inputs provided via the communications module 272 and/or parameters measured by various sensors (i.e., sensor inputs). The supervisor control module 270 may also adjust the commanded compressor speed based on feedback from the PFC control module 250 and/or the motor control module 260.

The supervisor control module 270 may also provide other commands to the PFC control module 250 and/or the motor control module 260. For example, based on the commanded speed, the supervisor control module 270 may command the PFC control module 250 to produce a commanded bus voltage. The supervisor control module 270 may adjust the commanded bus voltage based on additional inputs, such as operating parameters of the inverter power module 208 and the measured voltage of the incoming AC line.

The supervisor control module 270 may diagnose faults in various systems of the drive controller 132. For example only, the supervisor control module 270 may receive fault information from the PFC control module 250 and/or the motor control module 260. The supervisor control module 270 may also receive fault information via the communications module 272. The supervisor control module 270 may manage reporting and clearing of faults between the drive controller 132 and the system controller 130.

Responsive to the fault information, the supervisor control module 270 may instruct the PFC control module 250 and/or the motor control module 260 to enter a fault mode. For example only, in the fault mode, the PFC control module 250 may halt switching of the switches of the PFC module 204, while the motor control module 260 may halt switching of the switches of the inverter power module 208. In addition, the motor control module 260 may directly provide fault information to the PFC control module 250. In this way, the PFC control module 250 can respond to a fault identified by the motor control module 260 even if the supervisor control module 270 is not operating correctly and vice versa.

The PFC control module 250 may control switches in the PFC module 204 using pulse width modulation (PWM). More specifically, the PFC control module 250 may generate PWM signals that are applied to the switches of the PFC module 204. The duty cycle of the PWM signals is varied to produce desired currents in the switches of the PFC module 204. The desired currents are calculated based on an error between the measured DC bus voltage and a desired DC bus voltage. In other words, the desired currents are calculated in order to achieve the desired DC bus voltage. The desired currents may also be based on achieving desired power factor correction parameters, such as the shapes of current waveforms in the PFC module 204. The PWM signals generated by the PFC control module 250 may be referred to as PFC PWM signals.

The motor control module 260 may control switches in the inverter power module 208 using PWM in order to achieve the commanded compressor speed. The PWM signals generated by the motor control module 260 may be referred to as inverter PWM signals. The duty cycle of the inverter PWM signals controls the current through the windings of the motor (i.e., motor currents) of the compressor 102. The motor currents control motor torque, and the motor control module 260 may control the motor torque to achieve the commanded compressor speed.

In addition to sharing fault information, the PFC control module 250 and the motor control module 260 may also share data. For example only, the PFC control module 250 may receive data from the motor control module 260 such as load, motor currents, estimated motor torque, inverter temperature, duty cycle of the inverter PWM signals, and other suitable parameters. The PFC control module 250 may also receive data from the motor control module 260, such as the measured DC bus voltage. The motor control module 260 may receive data from the PFC control module 250 such as AC line voltage, current(s) through the PFC module 204, estimated AC power, PFC temperature, commanded bus voltage, and other suitable parameters.

In various implementations, some or all of the PFC control module 250, the motor control module 260, and the supervisor control module 270 may be implemented on an integrated circuit (IC) 280. For example only, the IC 280 may include a digital signal processor (DSP), a field programmable gate array (FPGA), a microprocessor, etc. In various implementations, additional components may be included in the IC 280. Additionally, various functions shown inside the IC 280 in FIG. 2 may be implemented external to the IC 280, such as in a second IC or in discrete circuitry. For example only, the supervisor control module 270 may be integrated with the motor control module 260.

Figure 3A:
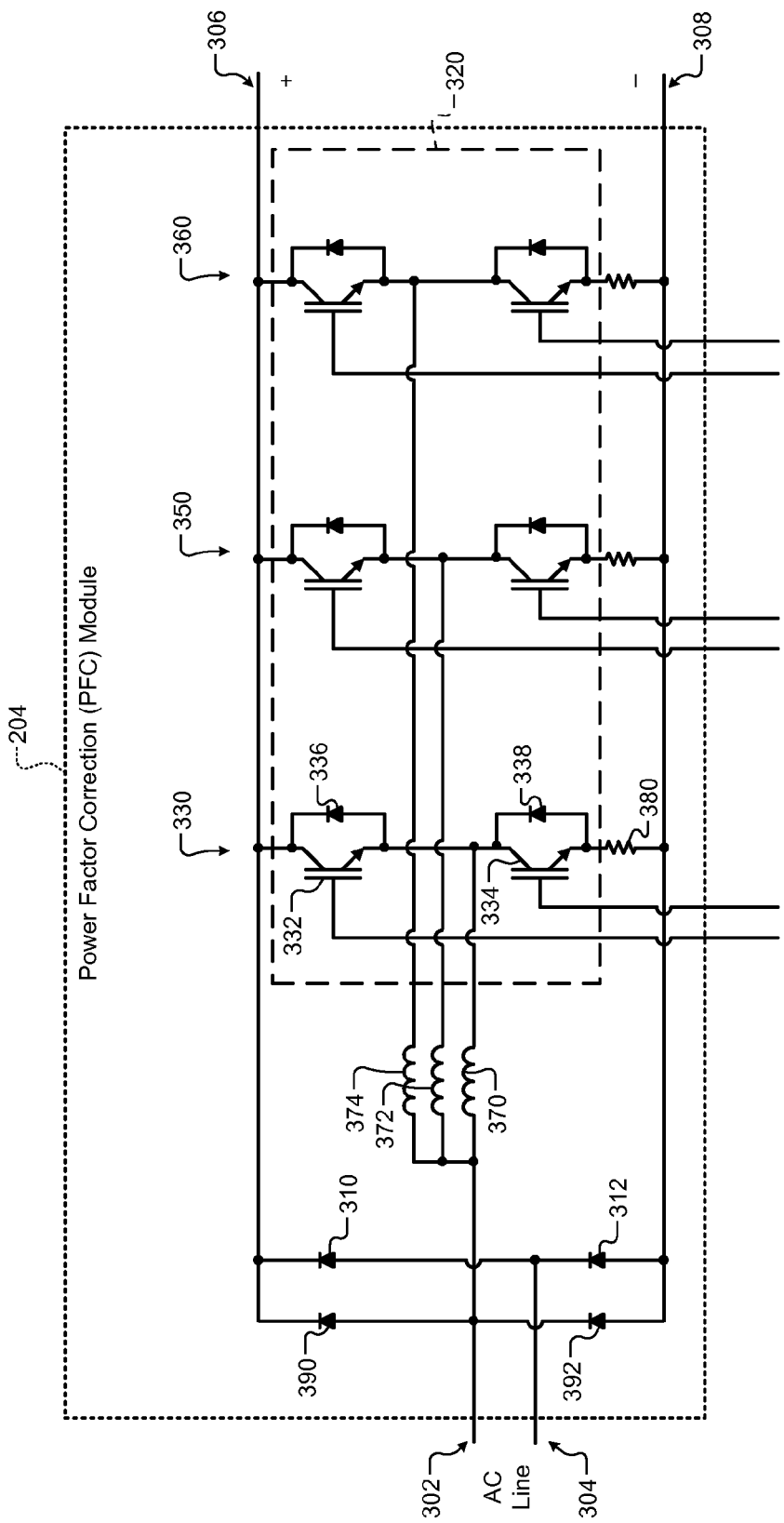
FIGS. 3a-3c are simplified schematics of example power factor correction (PFC) modules.

FIG. 3a is a schematic of an example implementation of the PFC module 204. The PFC module 204 receives AC power via first and second AC input terminals 302 and 304. The AC power may be, for example, the AC power output by the EMI filter 202. In various implementations, the signals at the first and second AC input terminals 302 and 304 may both be time-varying with respect to an earth ground. The PFC module 204 outputs DC power to the DC filter 206 and the inverter power module 208 via a positive DC terminal 306 and a negative DC terminal 308.

An anode of a first rectifier diode 310 is connected to the second AC input terminal 304, and a cathode of the first rectifier diode 310 is connected to the positive DC terminal 306. An anode of a second rectifier diode 312 is connected to the negative DC terminal 308, and a cathode of the second rectifier diode 312 is connected to the second AC input terminal 304. Each of the rectifier diodes 310 and 312 may be implemented as one or more individual series or parallel diodes.

A switch block 320 is connected between the positive and negative DC terminals 306 and 308. The switch block 320 includes a first PFC leg 330 that includes first and second switches 332 and 334. The switches 332 and 334 each include a first terminal, a second terminal, and a control terminal. In various implementations, each of the switches 332 and 334 may be implemented as an insulated gate bipolar transistor (IGBT). In such implementations, the first, second, and control terminals may correspond to collector, emitter, and gate terminals, respectively.

The first terminal of the first switch 332 is connected to the positive DC terminal 306. The second terminal of the first switch 332 is connected to the first terminal of the second switch 334. The second terminal of the second switch 334 may be connected to the negative DC terminal 308. In various implementations, the second terminal of the second switch 334 may be connected to the negative DC terminal 308 via a shunt resistor 380 to enable measuring current flowing through the first PFC leg 330.

The control terminals of the switches 332 and 334 receive generally complementary PFC PWM signals from the PFC control module 250. In other words, the PFC PWM signal provided to the first switch 332 is opposite in polarity to the PFC PWM signal provided to the second switch 334. Short circuit current may flow when the turning on of one of the switches 332 and 334 overlaps with the turning off of the other of the switches 332 and 334. Therefore, both the switches 332 and 334 may be turned off during a deadtime before either one of the switches 332 and 334 is turned on. Therefore, generally complementary means that two signals are opposite for most of their periods. However, around transitions, both signals may be low or high for some overlap period.

The first PFC leg 330 may also include first and second diodes 336 and 338 connected anti-parallel to the switches 332 and 334, respectively. In other words, an anode of the first diode 336 is connected to the second terminal of the first switch 332, and a cathode of the first diode 336 is connected to the first terminal of the first switch 332. An anode of the second diode 338 is connected to the second terminal of the second switch 334, and a cathode of the second diode 338 is connected to the first terminal of the second switch 334.

The switch block 320 may include one or more additional PFC legs. In various implementations, the switch block 320 may include one additional PFC leg. As shown in FIG. 3a, the switch block 320 includes second and third PFC legs 350 and 360. The number of PFC legs included in the switch block 320 may be chosen based on performance and cost. For example only, the magnitude of ripple (voltage and current) in the DC output of the PFC module 204 may decrease as the number of PFC legs increases. In addition, the amount of ripple current in the AC line current may decrease as the number of PFC legs increase. However, parts costs and implementation complexity may increase as the number of PFC legs increases.

The second and third PFC legs 350 and 360 of the switch block 320 may be similar to the first PFC leg 330. For example only, the second and third PFC legs 350 and 360 may each include respective components for the switches 332 and 334, the diodes 336 and 338, and respective shunt resisters connected in the same manner as the first PFC leg 330.

The PFC PWM signals provided to the switches of the additional PFC legs may also be complementary in nature. The PFC PWM signals provided to the additional PFC legs may be phase shifted from each other and from the PFC PWM signals provided to the first PFC leg 330. For example only, the phase shift of the PFC PWM signals may be determined by dividing 360 degrees (°) by the number of PFC legs. For example, when the switch block 320 includes three PFC legs, the PFC PWM signals may be phase shifted from each other by 120° (or 180° for two phases, or 90° for four phases, etc.). Phase shifting the PFC PWM signals may cancel ripple in the AC line current as well as the DC output.

The PFC module 204 includes a first inductor 370. The first inductor 370 is connected between the first AC input terminal 302 and the second terminal of the first switch 332. Additional inductors may connect the first AC input terminal 302 to additional PFC legs. For example only, FIG. 3a shows a second inductor 372 and a third inductor 374 connecting the first AC input terminal 302 to the second and third PFC legs 350 and 360, respectively.

A voltage may be measured across the shunt resistor 380 to determine current through the first PFC leg 330 according to Ohm's law. An amplifier (not shown), such as an operational amplifier, may amplify the voltage across the shunt resistor 380. The amplified voltage may be digitized, buffered, and/or filtered to determine the current through the first PFC leg 330. Current through other PFC legs may be determined using respective shunt resistors.

Figure 3B:
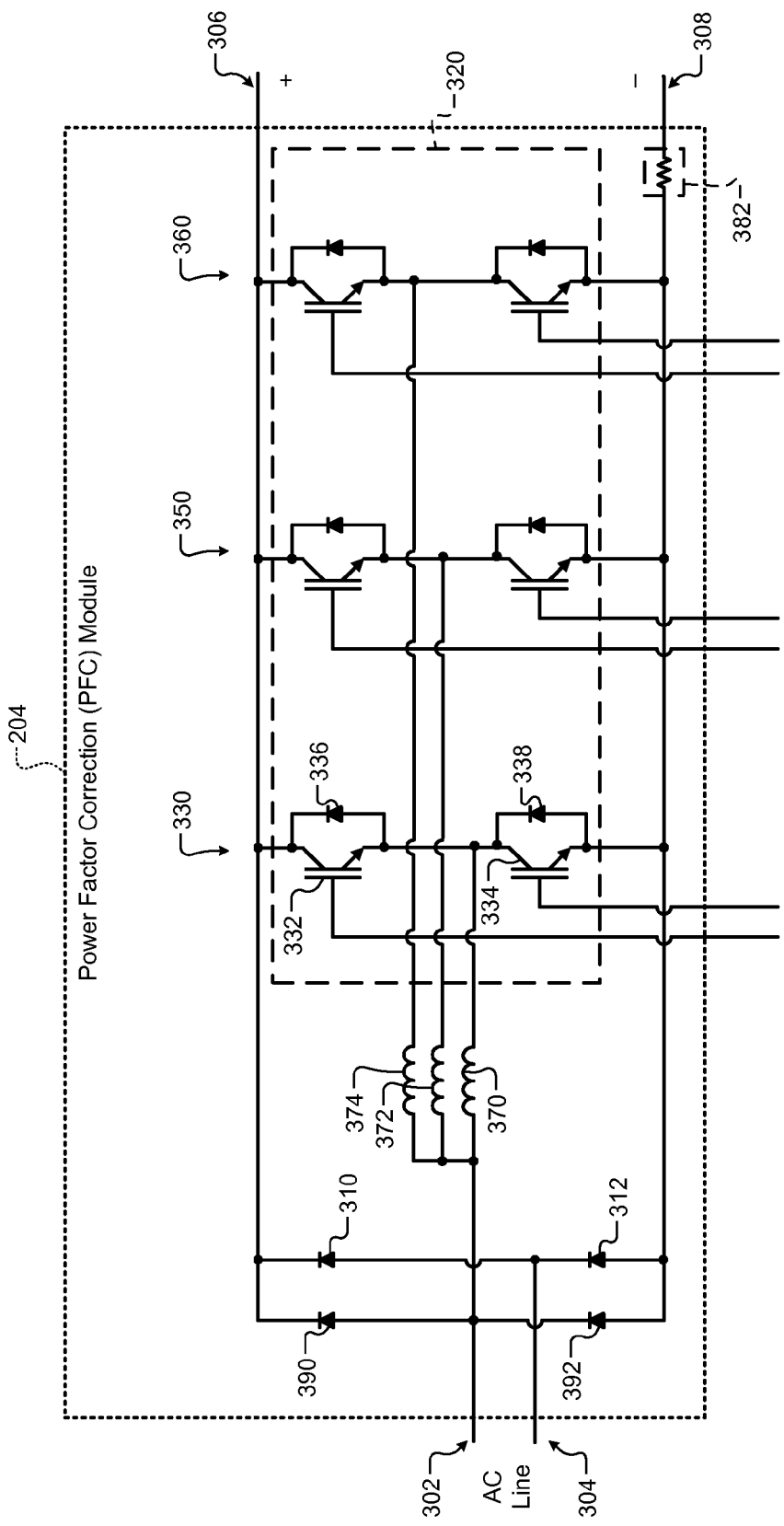

Additionally or alternatively, a resistor 382 may be connected in series with the negative DC terminal 308, as shown in FIG. 3b. Current through the resistor 382 may therefore indicate a total current output from the PFC module 204. Current through each of the PFC legs 330, 350, and 360 may be inferred from the total current based on the known phase timing of the current through the PFC legs 330, 350, and 360.

Figure 3C:
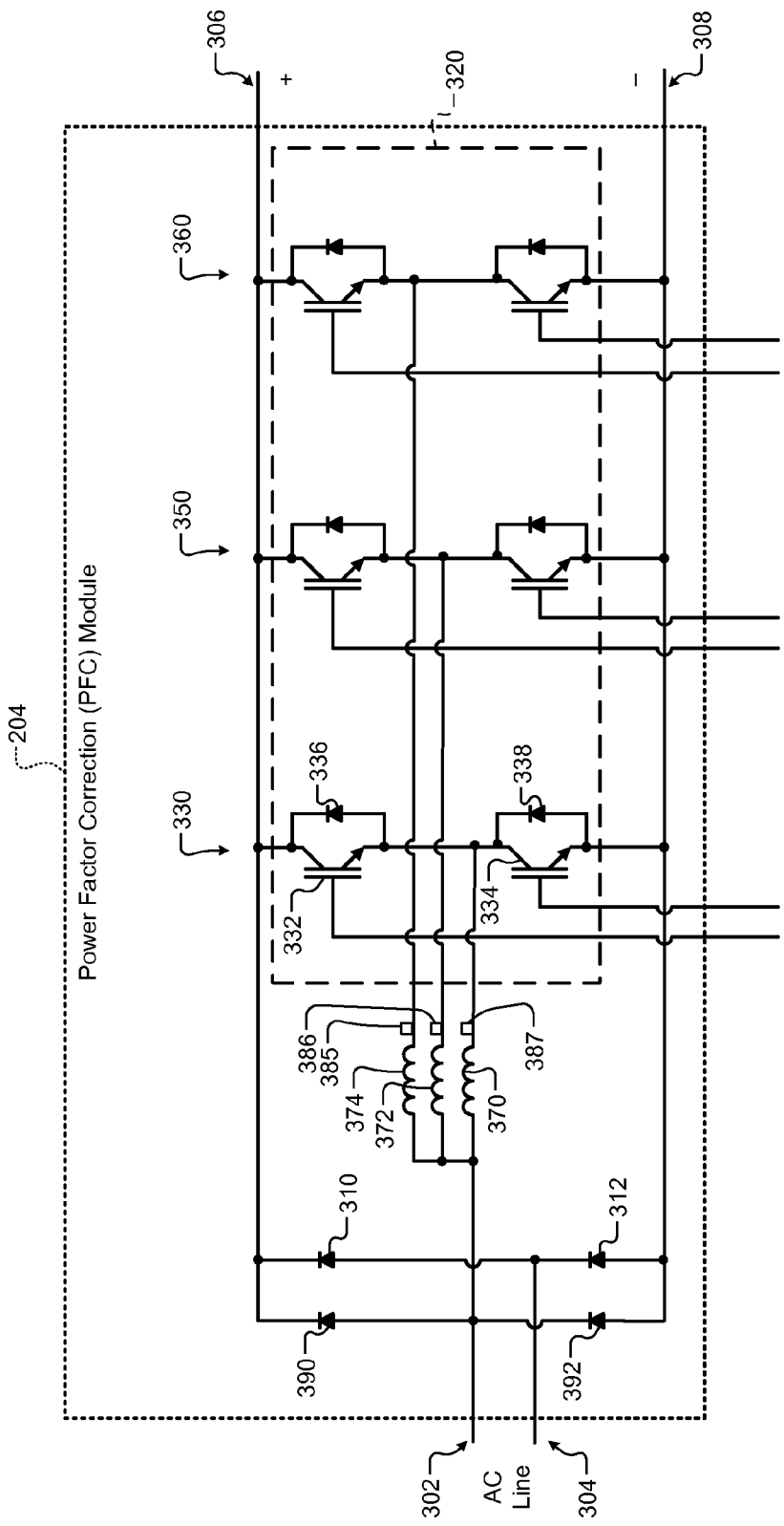

Any method of measuring or sensing current through any or all of the PFC legs 330, 350, 360 may be used. For example, in various implementations, the current through the first PFC leg 330 may be measured using a current sensor 387 (as shown in FIG. 3c). For example only, the current sensor 387 may be implemented in series with the first inductor 370. In various implementations, the current sensor 387 may include a Hall-effect sensor that measures the current through the first PFC leg 330 based on magnetic flux around the first inductor 370. Current through the PFC legs 350 and 360 may also be measured using associated current sensors 388 and 389, respectively.

The PFC module 204 may also include first and second bypass diodes 390 and 392. An anode of the first bypass diode 390 is connected to the first AC input terminal 302, and a cathode of the first bypass diode 390 is connected to the positive DC terminal 306. An anode of the second bypass diode 392 is connected to the negative DC terminal 308, and a cathode of the second bypass diode 392 is connected to the first AC input terminal 302.

The bypass diodes 390 and 392 may be power diodes, which may be designed to operate at low frequencies, such as, for example, frequencies less than approximately 100 Hz or approximately 200 Hz. Resistance of the bypass diodes 390 and 392 may be less than resistance of the inductors 370, 372, and 374. Therefore, when the switches 332 and 334 within the switch block 320 are not being switched, current may flow through the bypass diodes 390 and 392 instead of the diodes 336 and 338.

When the PFC module 204 is operating to create a boosted DC voltage, the boosted DC voltage will be greater than a peak voltage on the AC line. The bypass diodes 390 and 392 will therefore not be forward biased and will remain inactive. The bypass diodes 390 and 392 may provide lightning strike protection and power surge protection.

In various implementations, the bypass diodes 390 and 392 may be implemented with the rectifier diodes 310 and 312 in a single package. For example only, Vishay model number 26MT or 36MT or International Rectifier, model number 26MB or 36MB may be used as the bypass diodes 390 and 392 and the rectifier diodes 310 and 312. The rectifier diodes 310 and 312 carry current whether the PFC module 204 is generating a boosted DC voltage or not. Therefore, in various implementations, each of the rectifier diodes 310 and 312 may be implemented as two physical diodes connected in parallel. Current sensors may be used to measure PFC phase currents in series with the inductors 370, 372, and 374.

Figure 4A:
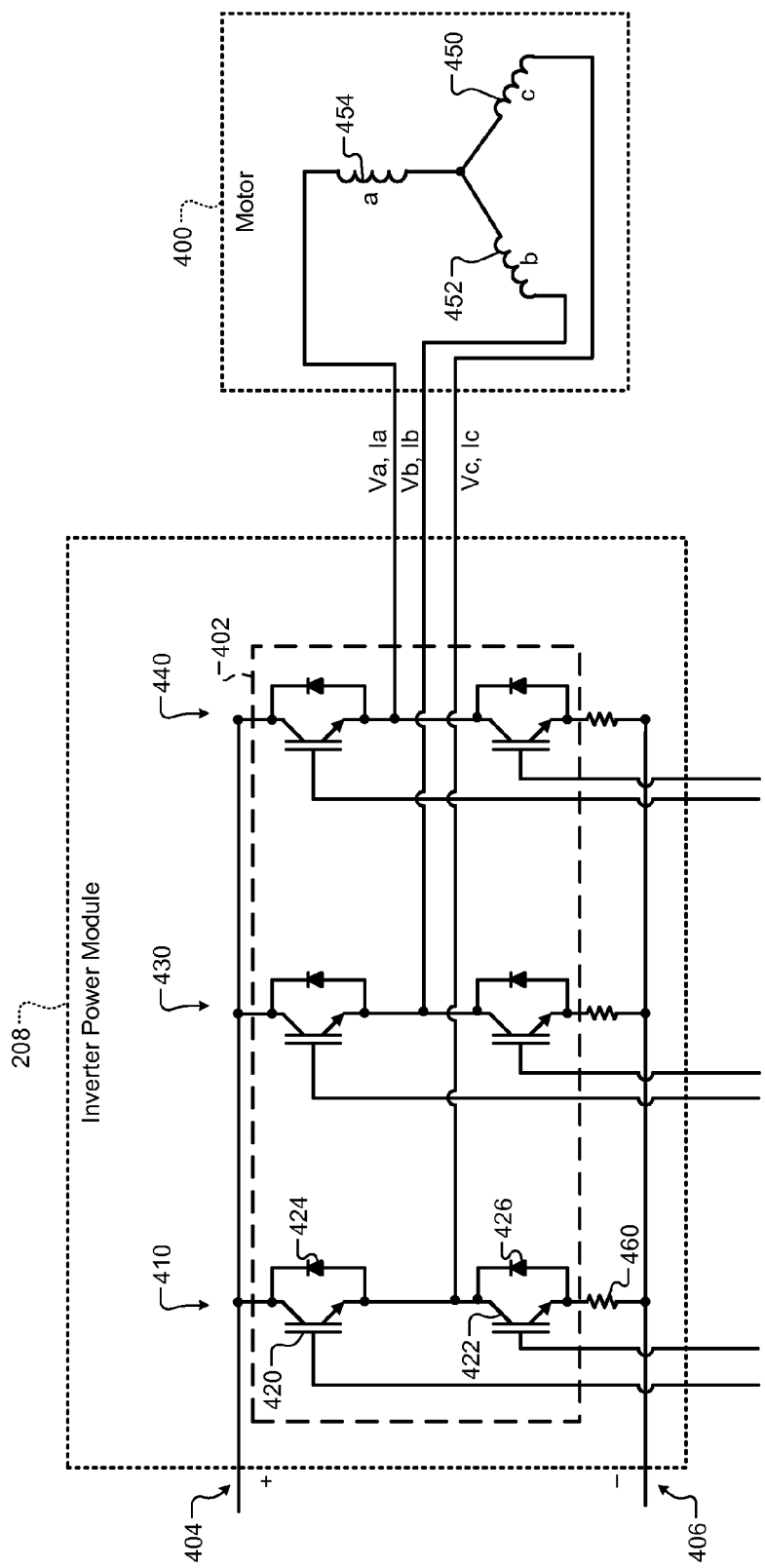
FIGS. 4a-4c are simplified schematics of example inverter power modules and example motors.

Referring now to FIG. 4a, a simplified schematic of a motor 400 and an example implementation of the inverter power module 208 is presented. The motor 400 is a component of the compressor 102 of FIG. 2. However, the principles of FIGS. 4a-4c may apply to other motors, including a motor of the condenser 104. The inverter power module 208 includes a switch block 402. In various implementations, the switch block 402 and the switch block 320 of the PFC module 204 may be implemented using a similar part. For example only, in FIG. 4a, a first inverter leg 410 includes first and second switches 420 and 422 and first and second diodes 424 and 426, which are arranged similarly to the switches 332 and 334 and the diodes 336 and 338 of FIG. 3a.

The switch block 402 receives the filtered DC voltage from the DC filter 206 via a positive DC terminal 404 and a negative DC terminal 406. The first terminal of the first switch 420 may be connected to the positive DC terminal 404, while the second terminal of the second switch 422 may be connected to the negative DC terminal 406. The control terminals of the switches 420 and 422 receive generally complementary inverter PWM signals from the motor control module 260.

The switch block 402 may include one or more additional inverter legs. In various implementations, the switch block 402 may include one inverter leg for each phase or winding of the motor 400. For example only, the switch block 402 may include second and third inverter legs 430 and 440, as shown in FIG. 4a. The inverter legs 410, 430, and 440 may provide current to windings 450, 452, and 454 of the motor 400, respectively. The windings 454, 452, and 450 may be referred to as windings a, b, and c, respectively. Voltage applied to the windings 454, 452, and 450 may be referred to as Va, Vb, and Vc, respectively. Current through the windings 454, 452, and 450 may be referred to as 1a, 1b, and 1c, respectively.

For example only, first ends of the windings 450, 452, and 454 may be connected to a common node. Second ends of the windings 450, 452, and 454 may be connected to the second terminal of the first switch 420 of the inverter legs 410, 430, and 440, respectively.

The inverter power module 208 may also include a shunt resistor 460 that is associated with the first inverter leg 410. The shunt resistor 460 may be connected between the second terminal of the second switch 422 and the negative DC terminal 406. In various implementations, respective shunt resistors may be located between each of the inverter legs 430 and 440 and the negative DC terminal 406. For example only, current through the first winding 450 of the motor 400 may be determined based on the voltage across the shunt resistor 460 of the first inverter leg 410. In various implementations, the shunt resistor of one of the inverter legs 410, 430, or 440 may be omitted. In such implementations, current may be inferred based on the measurements of the remaining shunt resistors.

Figure 4B:
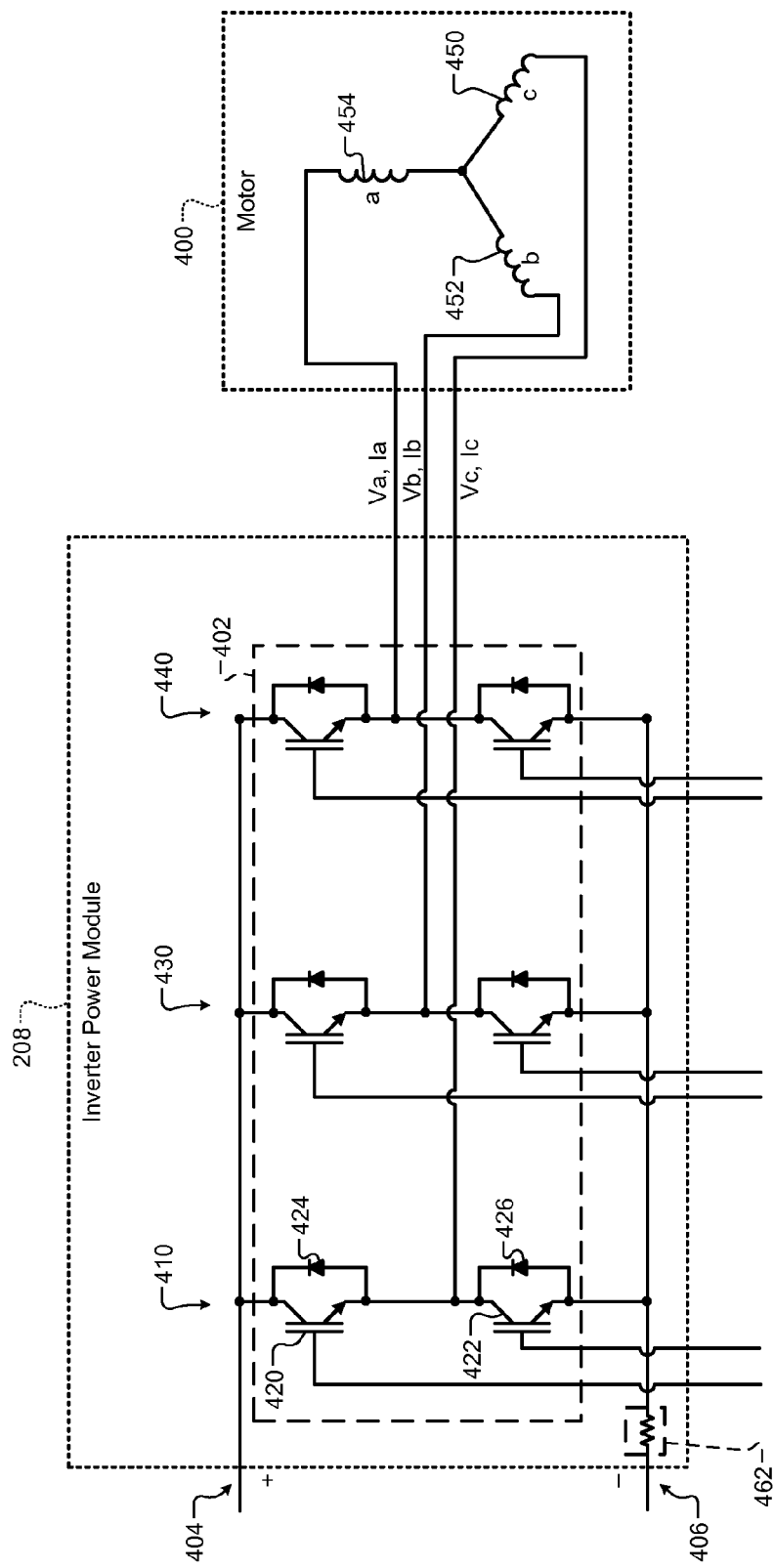
Figure 4C:
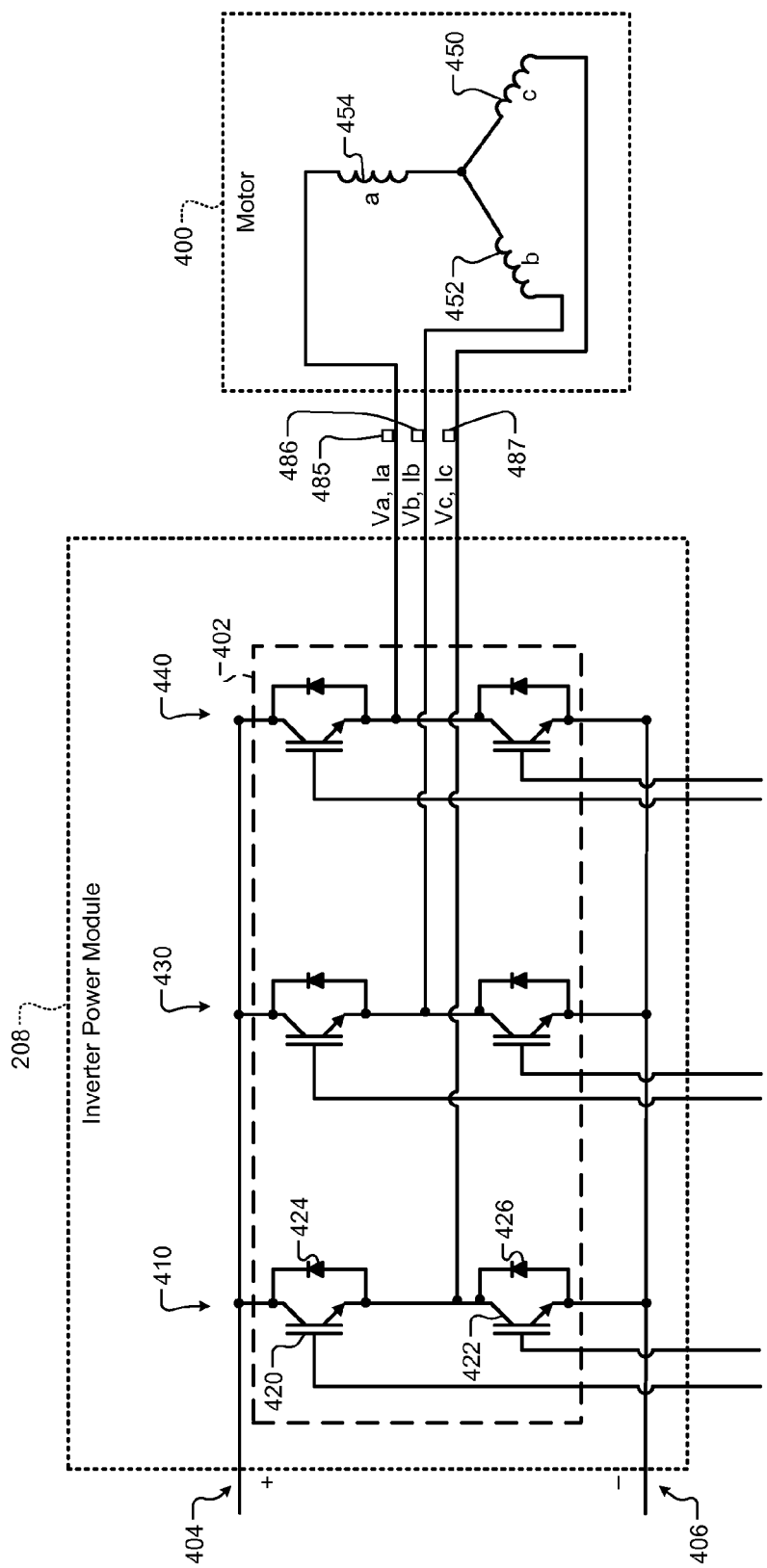

Additionally or alternatively, a resistor 462 may be connected in series with the negative DC terminal 406, as shown in FIG. 4b. Current through the resistor 462 may therefore indicate a total current consumed by the inverter power module 208. Current through each of the inverter legs 410, 430, and 440 may be inferred from the total current based on the known phase timing of the current through the inverter legs 410, 430, and 440. Further discussion of determining currents in an inverter can be found in commonly assigned U.S. Pat. No. 7,193,388, issued Mar. 20, 2007, which is incorporated by reference herein in its entirety.

Any method of measuring or sensing current through any or all of the inverter legs 410, 430, and 440 may be used. For example, in various implementations, the current through the first inverter leg 410 may be measured using a current sensor 487 (shown in FIG. 4c). For example only, the current sensor 487 may be implemented between the first inverter leg 410 and the first winding 450. Current through the inverter legs 430 and 440 may also be measured using associated current sensors 488 and 489, respectively. In various implementations, current sensors may be associated with two of the inverter legs 410, 430, and 440. The current through the other one of the inverter legs 410, 430, and 440 may be determined based on an assumption that the current in the motor windings sums to zero.

Figure 5:
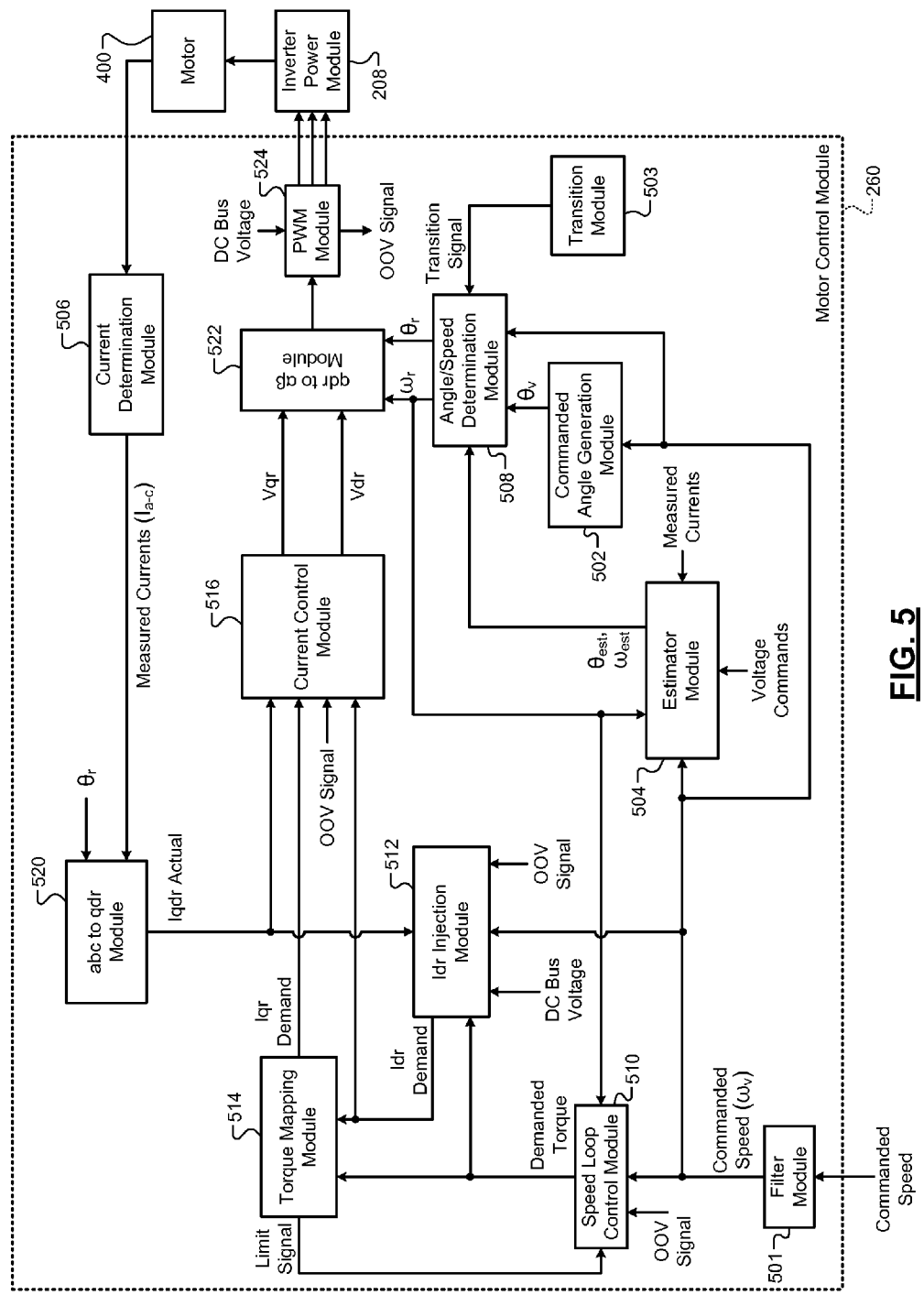
FIG. 5 is a functional block diagram of a motor control module according to the present disclosure.

Referring now to FIG. 5, an example implementation of the motor control module 260 of FIG. 2 is shown. The motor control module 260 controls switches within the inverter power module 208 to control voltages applied to the windings 454, 452, 450 (hereinafter, "windings$_{a-c}$") of the motor 400. This may also be referred to as controlling the inverter power module 208 or as controlling the motor 400.

For example, when the motor 400 includes a three-phase motor, the motor control module 260 may apply voltages $V_{a-c}$ to windings$_{a-c}$, respectively. Voltages $V_{a-c}$ may collectively be referred to as output voltages. Currents $I_{a-c}$ are generated in the windings$_{a-c}$, respectively, when voltages $V_a$, are applied to the windings$_{a-c}$. Currents $I_{a-c}$ may collectively be referred to as winding currents. Currents in the windings$_{a-c}$ produce magnetic flux about the windings$_{a-c}$, and vice versa. The motor control module 260 generates the output voltages to control the winding currents and/or to control magnetic flux.

The motor 400 includes a rotor (not shown) that rotates in response to the winding currents. The motor control module 260 controls the amplitude, duty cycle, and/or frequency of the output voltages to control the torque and speed of the rotor. The motor control module 260 may control the output voltages based on a commanded motor speed, which represents a desired rotational speed of the rotor.

The motor control module 260 may implement field oriented control of the motor 400. Accordingly, the motor control module 260 may map motor driving variables onto various frames of reference. Motor driving variables may include requested current/voltage values used to control the motor 400 as well as measured currents/voltages. For example, motor driving variables may include measured currents $I_{a-c}$, through the windings$_{a-c}$ and voltage requests used by the motor control module 260 to apply voltages $V_{a-c}$ to the windings$_{a-c}$.

The motor control module 260 may map motor driving variables in an abc frame of reference (FoR), an αβ FoR, and a qdr FoR. The abc FoR may represent, for example, a three-phase stator frame based on the windings$_{a-c}$. Each of the measured currents $I_{a-c}$ may be mapped onto respective axes a, b, and c of the abc FoR. Additionally, the motor control module 260 may map requested voltages corresponding to voltages $V_{a-c}$ in the abc FoR.

The αβ FoR includes stationary, stator-based x and y coordinates onto which the motor driving variables are projected. The qdr FoR is a rotating FoR that corresponds to the rotor and rotates in sync with the rotor. Accordingly, the qdr FoR is based on an angle of the rotor.

The motor control module 260 may transform motor driving variables from one FoR to another FoR. For example, the motor control module 260 may transform currents represented in the abc FoR into currents represented in the αβ FoR and vice versa. The motor control module 260 may transform motor driving variables from the abc FoR to the αβ FoR using a numerical transformation. The motor control module 260 may transform motor driving variables from the αβ FoR to the qdr FoR based on the angle of the rotor.

The motor control module 260 controls the inverter power module 208 based on the commanded speed from the supervisor control module 270 of FIG. 2. In various implementations, a filter module 501 may filter the commanded speed from the supervisor control module 270 of FIG. 2. In these implementations, the output of the filter module 501 is referred to below as the commanded speed $\omega_v$.

In open loop mode, the actual speed of the rotor will generally follow the commanded speed $\omega_v$, assuming that the commanded speed $\omega_v$ does not change too quickly. As a result, the coefficients of the low-pass filter of the filter module 501 may be chosen so that the rotor acceleration can keep up with changes in the commanded speed $\omega_v$ output from the filter module 501. Otherwise, rotor synchronization may be lost. In various implementations, the filter module 501 may implement a ramp function, which updates the commanded speed $\omega_v$ by up to a maximum increment during each predetermined interval of time.

The motor control module 260 may control the motor 400 based on a commanded FoR (e.g., a qdv FoR) when operating in open loop mode. The qdv FoR is associated with the commanded speed $\omega_v$ of the rotor and a commanded angle ($\theta_v$) of the rotor. A commanded angle generation module 502 may determine the commanded angle $\theta_v$, such as by integrating the commanded speed $\omega_v$.

The motor control module 260 may operate in various modes, such as open loop mode or a closed loop mode. For example only, the motor control module 260 may operate in open loop mode when starting the motor 400 and later transition to operating in closed loop mode. When operating in open loop mode, the rotor will tend to synchronize with the commanded speed $\omega_v$, especially when the motor control module 260 is operating the rotor at slower speeds. However, the actual rotor angle may differ from the commanded angle $\lambda_v$ because of a load applied to the motor 400. For example, a change in load while operating in open loop mode may change a phase difference between the commanded angle $\theta_v$ and the actual rotor angle.

A transition module 503 determines when to transition the motor control module 260 from open loop mode to closed loop mode. For example only, the transition module 503 may determine when to transition based on at least one of the commanded speed $\omega_v$, an operating time of the motor 400, a commanded acceleration of the rotor, and/or feedback from an estimator module 504.

For example, the transition module 503 may predict the speed of the rotor based on the commanded acceleration and/or the operating time. The transition module 503 may transition from open to closed loop when the predicted speed is greater than a speed threshold. In various implementations, the transition module 503 may transition from open loop mode to closed loop mode when an elapsed time from when the motor 400 was started exceeds a predetermined period.

The estimator module 504 estimates the speed ($\omega_{est}$) and angle ($\theta_{est}$) of the rotor. The estimator module 504 may determine the estimated speed $\omega_{est}$ based on the estimated angle $\theta_{est}$. For example, the estimator module 504 may differentiate and filter the estimated angle $\theta_{est}$ over a period of time to determine the estimated speed $\omega_{est}$. The transition module 503 may transition from open to closed loop mode when the estimator module 504 has achieved stable estimates of the estimated angle $\theta_{est}$ and the estimated speed $\omega_{est}$. In various implementations, the transition module 503 may transition from open loop mode to closed loop mode when convergence in the estimator module 504 has occurred, which may be indicated by, for example, flux estimates.

Alternatively, the transition module 503 may transition from open loop mode to closed loop mode when the commanded speed $\omega_v$ is greater than the speed threshold. Alternatively or additionally, the transition module 503 may initiate a transition when the estimated speed $\omega_{est}$ of the rotor is greater than a predetermined speed. Other factors affecting when to perform the transition may include a load on the motor 400 and motor driving variables.

The estimator module 504 may determine the estimated angle $\theta_{est}$ based on various motor driving variables. For example, the motor driving variables may include $V_{a-c}$ to be applied to the windings$_{a-c}$ and $I_{a-c}$ measured in the windings$_{a-c}$. Additionally, the estimator module 504 may determine the estimated angle $\theta_{est}$ based on the commanded speed $\omega_v$. The estimator module 504 may implement a state observer (e.g., a Luenberger observer) to determine the estimated angle $\theta_{est}$ and the estimated speed $\omega_{est}$ based on the motor driving variables. Further description of sensorless control systems and methods can be found in U.S. Pat. Nos. 6,756,757, issued Jun. 29, 2004, 7,208,895, issued Apr. 24, 2007, 7,342,379, issued Mar. 11, 2008, and 7,375,485, issued May 20, 2008, which are incorporated herein by reference in their entirety.

A current determination module 506 may measure the currents $I_{a-c}$ of the windings$_{a-c}$ (hereinafter "measured currents"). The estimator module 504 may use the measured currents to estimate $\theta_{est}$ and $\omega_{est}$.

An angle/speed determination module 508 generates an output angle $\theta_r$ and an output speed $\omega_r$ based on the currently enabled mode, such as open loop mode or closed loop mode. The angle/speed determination module 508 may set the output angle $\theta_r$ equal to the commanded angle $\theta_v$ when operating in open loop mode and may set the output angle $\theta_r$ equal to the estimated angle $\theta_{est}$ when operating in closed loop mode.

When the transition module 503 instructs a transition from open loop mode to closed loop mode, the angle/speed determination module 508 gradually adjusts the output angle $\theta_r$ from the commanded angle $\theta_v$ to the estimated angle $\theta_{est}$. This gradual adjustment may minimize transient current demands when transitioning from open loop mode to closed loop mode, which may prevent disruption of current control (described below) and/or estimation of the estimated angle $\theta_{est}$. The gradual adjustment may therefore improve stability during transitions and allow for starting the motor 400 more reliably, especially under higher loads.

The angle/speed determination module 508 may set the output speed $\omega_r$ equal to the commanded speed $\omega_v$ when operating in open loop mode. The angle/speed determination module 508 may set the output speed $\omega_r$ equal to the estimated speed $\omega_{est}$ when operating in closed loop mode. In various implementations, the angle/speed determination module 508 may immediately switch the output speed $\omega_r$ from the commanded speed $\omega_v$ to the estimated speed $\omega_{est}$ when the transition module 503 instructs a transition from open loop mode to closed loop mode.

The transition module 503 may also instruct a change from closed loop mode back to open loop mode. For example only, a transition back to open loop mode may be performed when error conditions, such as a lost rotor, or abnormal operating conditions, are observed. The angle/speed determination module 508 may therefore also switch the output speed $\omega_r$ from the estimated speed $\omega_{est}$ back to the commanded speed $\omega_v$, and switch the output angle $\theta_r$ from the estimated angle $\theta_{est}$ back to the commanded angle $\theta_v$. In various implementations, similarly to the transition from open loop mode to closed loop mode, switching the output speed $\omega_r$ may be performed immediately, while switching the output angle $\theta_r$ may be performed gradually.

In various implementations, additional modes may be supported. For example only, three, four, or more modes may be supported. The transition module 503 may instruct the angle/speed determination module 508 to transition from one of the modes to another. During each transition, the angle/speed determination module 508 may switch the output speed $\omega_r$ immediately to a speed corresponding to the selected mode. Alternatively, the output speed $\omega_r$ may be ramped toward the speed of the selected mode. Further, the angle/speed determination module 508 ramps the output angle $\theta_r$ toward an angle corresponding to the selected mode. The transition module 503 may instruct the angle/speed determination module 508 to transition from one of the modes to another using a transition signal. For example, the transition signal may specify a target mode to which the angle/speed determination module 508 should transition.

A speed loop control module 510 generates a demanded torque signal calculated to match the output speed $\omega_r$ to the commanded speed $\omega_v$. In various implementations, the speed loop control module 510 may be bypassed in open loop mode. In closed loop mode, the output speed $\omega_r$ is equal to the estimated speed $\omega_{est}$ of the motor 400. Therefore, the speed loop control module 510 may generate the demanded torque signal in order to keep the speed of the motor 400 approximately equal to the commanded speed $\omega_v$. For example only, when the output speed $\omega_r$ is less than the commanded speed $\omega_v$, the speed loop control module 510 may increase the demanded torque, and vice versa.

An Idr injection module 512 generates a d-axis current (Idr) demand based on the DC bus voltage, the demanded torque signal, and the commanded speed $\omega_v$. The Idr demand is used by current control, described below, for Idr injection, which may also be referred to as field weakening or phase advance. In various implementations, the Idr injection module 512 may adjust the Idr demand based on an out of volts (OOV) signal, described below, and measured current.

A torque mapping module 514 generates a q-axis current (Iqr) demand based on the demanded torque signal. Torque may also be generated by the Idr demand and therefore, the torque mapping module 514 may determine the Iqr demand based also on the Idr demand. For example only, the torque mapping module 514 may implement a maximum current limit. In various implementations, the torque mapping module 514 may compare a combination of the Idr demand and the Iqr demand to the maximum current limit, and reduce one or both of the demands when the combination exceeds the maximum current limit. In various implementations, the torque mapping module 514 may limit only the Iqr demand. For example only, the maximum current limit may be a root mean square limit, such as 25 Amps$_{rms}$.

When the torque mapping module 514 is limiting the Iqr demand to meet the maximum current limit, the torque mapping module 514 may output a limit signal to the speed loop control module 510. When the limit signal is received, the speed loop control module 510 may temporarily suspend increasing the demanded torque. In addition, the speed loop control module 510 may also temporarily suspend increasing the demanded torque based on the OOV signal.

For example only, the speed loop control module 510 may attempt to match the output speed $\omega_r$ to a reduced version of the commanded speed $\omega_v$. Alternatively or additionally, the speed loop control module 510 may selectively suspend error summing and/or integrating operation that would lead to increasing the demanded torque. In other words, when the torque mapping module indicates, via the limit signal, that the maximum current limit is reached, the speed loop control module 510 may stop increasing the demanded torque because the present demanded torque already cannot be achieved within the maximum current limit.

A current control module 516 determines voltage commands Vqr and Vdr, in the qdr FoR, based on the current demands Iqr and Idr. The voltage commands Vqr and Vdr may be a q-axis voltage command and a d-axis voltage command, respectively. In various implementations, the current control module 516 may determine the voltage commands Vqr and Vdr based also on the measured currents. In various implementations, the current control module 516 may attempt to match the measured currents to the Iqr and Idr demands by adjusting the voltage commands Vqr and Vdr. In various implementations, the current control module 516 may also receive the output speed $\omega_r$.

An abc to qdr module 520 maps the measured currents $I_{a-c}$ onto the qdr FoR based on the output angle $\theta_r$. The resulting mapped current may be referred to as Iqdr, and may include Iqr and Idr components. The measured currents used by components of the motor control module 260, such as the current control module 516, may therefore use the Iqdr representation of the measured currents.

A qdr to $\alpha\beta$ module 522 may transform the voltage commands Vqr and Vdr from the qdr FoR to the $\alpha\beta$ FoR, thereby generating a voltage request in the $\alpha\beta$ FoR (hereinafter "voltage request"). The voltage request may indicate the voltages to be applied to the windings$_{a-c}$. The qdr to $\alpha\beta$ module 522 may perform the transformation based on the output angle $\theta_r$, and in various implementations, may perform the transformation based on the output speed $\omega_r$.

A pulse-width modulation (PWM) module 524 generates duty cycle signals to control the inverter power module 208 using PWM. For example only, the PWM switching frequency may be approximately 5 kHz or approximately 10 kHz. In various implementations, the inverter power module 208 and the motor 400 have three phases, and the PWM module 524 generates three duty cycle signals, one for each inverter leg.

In various implementations, each leg of the inverter power module 208 includes a pair of complementary switches, and each of the duty cycle signals is therefore converted into complementary duty cycle signals, one for each of the complementary switches. For example only, referring to FIG. 4a, the switch 420 and the switch 422 of the first inverter leg 410 may be controlled with complementary duty cycles.

In various implementations, to prevent a short circuit condition, where both the switches 420 and 422 are on simultaneously, the complementary duty cycles may be adjusted so that a switch is not turning on at the same time the other switch is turning off. In other words, the off-times of the two switches are partially overlapped.

The PWM module 524 determines the duty cycle signals based on the DC bus voltage and the voltage requests from the qdr to $\alpha\beta$ module 522.

For example only, the PWM module 524 may transform the voltage request from the $\alpha\beta$ FoR to the abc FoR to determine three voltage demands, hereinafter $Vr_a$, $Vr_b$, and $Vr_c$ (collectively $Vr_{a-c}$), corresponding to the windings$_{a-c}$, respectively.

When the voltage demands can not be met given the present DC bus voltage, the drive controller 132 is defined to be operating in the OOV state. For example only, a maximum duty cycle may be defined in the PWM module 524. If the voltage demands would result in one of the duty cycles being greater than the maximum duty cycle, the drive controller 132 is operating in the OOV state.

In various implementations, the maximum duty cycle may be set to be less than 100%, such as 96%, 95%, or 92%. The maximum duty cycle limit may be set based on requirements for accurate measurement of the winding currents $I_{a-c}$. A corresponding minimum duty cycle limit may also be defined. For example only, the minimum duty cycle limit may be equal to one minus the maximum duty cycle limit.

In various implementations, the motor 400 may respond not to the winding voltages themselves, but instead to differences between the winding voltages. As a simplistic example, applying 50 Volts to a first winding and 150 Volts to a second winding may be equivalent to applying 0 Volts to the first winding and 100 Volts to the second winding. Therefore, even if one of the voltage demands may exceed an available voltage, the PWM module 524 may shift the voltage demands when generating the duty cycles.

In such implementations, the PWM module 524 may determine that the drive controller 132 is in the OOV state when a difference between any two of the three voltage demands is greater than the available voltage. For example only, the available voltage may be equal to the DC bus multiplied by the maximum duty cycle. In various implementations, the PWM module 524 may shift the duty cycles such that one of the duty cycles is set to zero. Alternatively, the PWM module 524 may shift the duty cycles such that the duty cycles are centered about a middle duty cycle, such as 50%. In various implementations, the PWM module 524 may shift the duty cycles using one or the other of these approaches, depending on an operating mode. For example only, the PWM module 524 may shift the duty cycles such that the lowest duty cycle is set to zero when the motor 400 is operating at speeds above a predetermined threshold.

In the OOV state, the difference between the duty cycles corresponding to the voltage demands is greater than the difference between the minimum and maximum duty cycles. Therefore, when operating in the OOV state, the PWM module 524 may scale the voltage demands down before generating the duty cycles. Equivalently, the PWM module 524 may scale the duty cycles. In various implementations, the PWM module 524 may scale the duty cycles or voltage demands as little as possible, such that one of the duty cycles is set to the minimum duty cycle, and one of the duty cycles is set to the maximum duty cycle.

The scaling factor is an indication of how far OOV the drive controller 132 currently is. The scaling factor may be referred to as OOV magnitude, and may be included in the OOV signal. In the OOV state, the PWM module 524 sets an OOV flag to a first value, such as 1. When not in the OOV state, the PWM module 524 sets the OOV flag to a second value, such as 0. The OOV flag may be included in the OOV signal.

An OOV amount may be determined based on the OOV flag. For example only, the OOV amount may indicate how often the drive controller 132 is operating OOV. For purposes of illustration only, the inverter power module 208 may define an operating region shaped like a hexagon. The voltage demands may be thought of as circles within the hexagon. If the circles are centered within the hexagon, as the circles expand, they will touch the sides of the hexagon. When the circles expand beyond the hexagon, the circles become more and more clipped at each face of the hexagon. Clipping may correspond to the OOV state. As a result, the proportion of time that the voltage demands are clipping (producing the OOV state) indicates how far OOV the driver controller 132 is.

The OOV amount may represent a portion of the time that the drive controller 132 is spending in the OOV state. The OOV amount may be determined by applying a filter, such as a digital low-pass filter, to the OOV flag. For example only, the OOV amount may be determined by applying a moving average to the OOV flag. When the OOV flag assumes values of 0 or 1, the OOV amount will then range between 0 and 1, inclusive. When multiplied by 100, the OOV amount is the percentage of time the drive controller 132 is spending in the OOV state.

The motor control module 260 may use multiple approaches to minimize OOV operation, or to maintain OOV operation below a predetermined threshold. In various implementations, the Idr injection module 512 may use the OOV amount in determining how to adjust the Idr demand. The speed loop control module 510 may also use the OOV amount to determine when to suspend increases in the demanded torque. The current control module 516 may suspend increases to one or both of the Vqr and Vdr commands based on the OOV flag.

Figure 6:
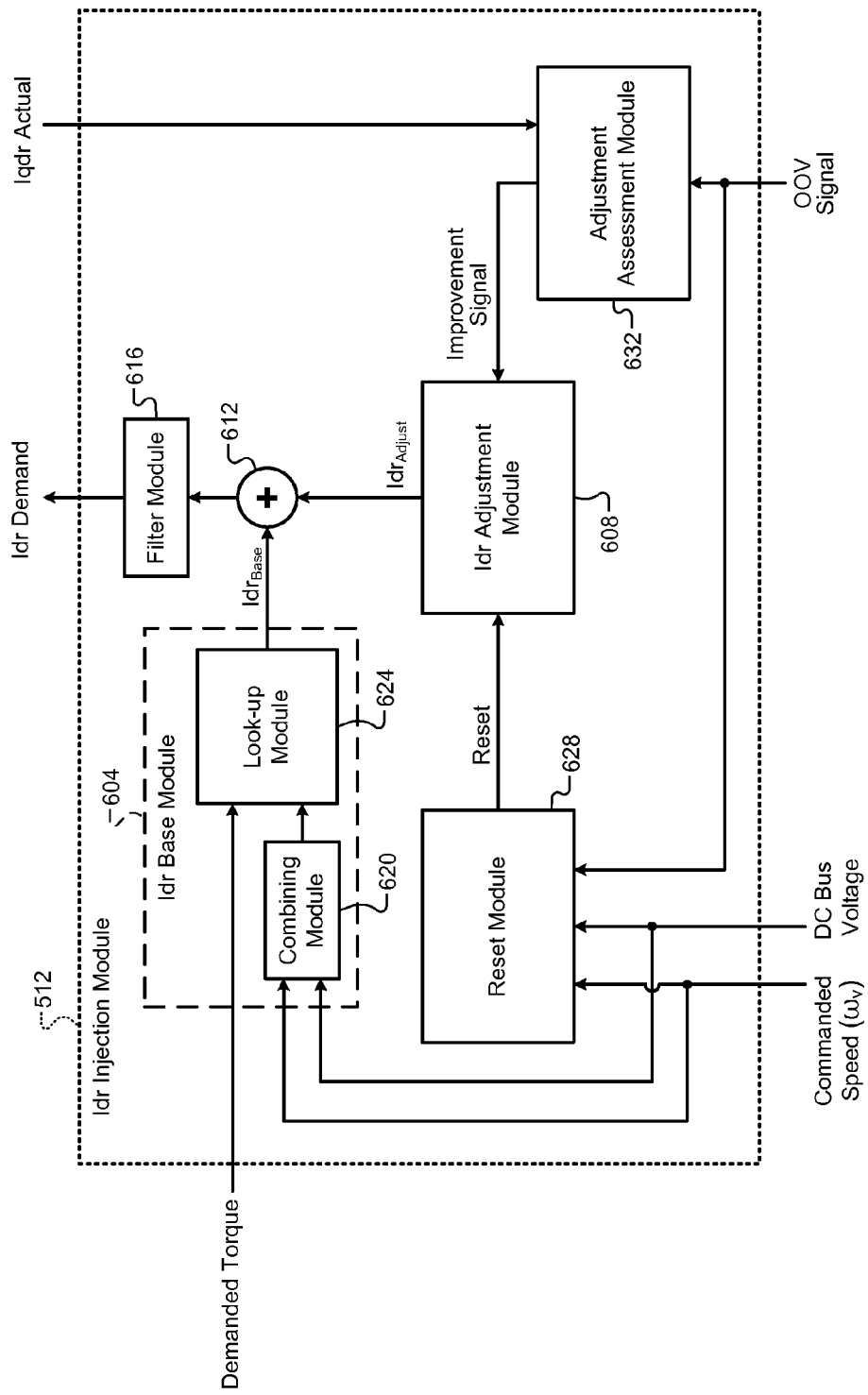
FIG. 6 is a functional block diagram of an Idr injection module according to the present disclosure.

Referring now to FIG. 6, an example implementation of the Idr injection module 512 is shown. The Idr injection module 512 may implement an Idr correction system that reduces the current drawn without operating the drive controller 132 above an acceptable OOV threshold. In order to operate under the acceptable OOV threshold for a range of motors, whose individual characteristics may vary, predetermined values of Idr demand may be set conservatively.

In other words, while the predetermined values of Idr demand should prevent the drive controller 132 from exceeding the acceptable OOV threshold, in some situations, the amount of current used to control the motor 400 may be higher than necessary. The Idr correction system of the present disclosure may therefore adjust the predetermined values of Idr demand to reduce the current used, while maintaining operation under the acceptable OOV threshold.

The Idr injection module 512 of FIG. 6 includes an Idr base module 604 that outputs an $Idr_{Base}$ value and an Idr adjustment module 608 that outputs an $Idr_{Adjust}$ value. A summing module 612 adds the $Idr_{Base}$ and $Idr_{Adjust}$ values. This sum may be output from the Idr injection module 512 as the Idr demand. Alternatively, a filter module 616 may apply a filter, such as a low-pass filter, to the sum to generate the Idr demand.

The Idr base module 604 may generate the $Idr_{Base}$ value based on the DC bus voltage, the commanded speed ($\omega_v$), and the demanded torque. For example only, the Idr base module 604 may generate the $Idr_{Base}$ value based on a look-up table indexed by one or more of the inputs to the Idr base module 604. For example only, a three-dimensional look-up table may be indexed by all three inputs.

In various implementations, a combining module 620 combines the commanded speed and the DC bus voltage into a single number. In various implementations, the combining module 620 may divide the commanded speed by the DC bus voltage to generate the single number. A look-up module 624 may generate the $Idr_{Base}$ value based on the single number from the combining module 620 and the demanded torque. In various implementations, the look-up module 624 may include a two-dimensional look-up table indexed by the single number from the combining module 620 and by the demanded torque. The value retrieved from the look-up module 624 may be output from the Idr base module 604 as the $Idr_{base}$ value.

The Idr adjustment module 608 receives a reset signal from a reset module 628. When the reset signal is received, the Idr adjustment module 608 may set the $Idr_{Adjust}$ value to a predetermined value, such as zero. The reset module 628 may generate the reset signal when one or more reset conditions are present.

For example only, one reset condition may be when the OOV signal exceeds a predetermined threshold, such as 10 percent or 12 percent. Another reset condition may be that the DC bus voltage has varied too far from a previous value of the DC bus voltage. For example only, when the reset module 628 generates the reset signal, the reset module 628 may store the value of the DC bus voltage. When the absolute value of the difference between the stored value of the DC bus voltage and the DC bus voltage exceeds a predetermined threshold, the reset module 628 may generate the reset signal.

Similarly, the reset module 628 may generate the reset signal when the commanded speed differs by more than a predetermined threshold from a stored value of the commanded speed. Another reset condition may be indicated by the transition signal. For example only, the reset module 628 may generate the reset signal during selected modes, such as open loop mode. This prevents Idr adjustment during the selected modes.

The Idr adjustment module 608 may adjust the $Idr_{Adjust}$ value at predetermined intervals. In various implementations, the reset module 628 may generate the reset signal when a parameter changes by more than a predetermined threshold over a predetermined number of the predetermined intervals. For example only, the parameter may include commanded speed and/or DC bus voltage.

The Idr adjustment module 608 generates $Idr_{Adjust}$ and varies $Idr_{Adjust}$ to achieve improvements in motor parameters. For example only, for a given set of operating conditions, the $Idr_{Base}$ value may be a conservative value of the Idr demand selected to reduce the likelihood of operating out of volts (or operating in an unacceptably high out of volts condition). However, with additional or less Idr, the motor 400 may operate more efficiently. For example only, the motor 400 may be able to maintain the same speed while using less current.

To improve motor operating performance, the Idr adjustment module 608 varies the $Idr_{Adjust}$ value and monitors whether that adjustment leads to an improvement. For example only, the Idr adjustment module 608 may increase or decrease the $Idr_{Adjust}$ value by a predetermined amount. For example only, the predetermined amount may be in the range of 0.00-0.25 Amperes, and may vary based on operating conditions.

Whether to increment or decrement is determined based on whether a previous increment or decrement yielded an improvement. If a previous increment yielded an improvement, the Idr adjustment module 608 will perform another increment of the $Idr_{Adjust}$ value. Otherwise, if the increment did not yield an improvement, the Idr adjustment module 608 may begin decrementing the $Idr_{Adjust}$ value. In addition, if an increment did not yield an improvement, the Idr adjustment module 608 may reverse that increment before beginning to decrement. In other words, the Idr adjustment module 608 may set the $Idr_{Adjust}$ value to the value prior to the increment that did not yield an improvement.

Control of decrementing may be similar to incrementing. For example, if a decrement does not yield an improvement, the Idr adjustment module 608 may revert the $Idr_{Adjust}$ value to the previous value prior to the decrement. The Idr adjustment module 608 may then begin incrementing.

The Idr adjustment module 608 may determine that a change in the $Idr_{Adjust}$ value has yielded an improvement by monitoring an improvement signal from an adjustment assessment module 632. The adjustment assessment module 632 may measure various motor operating parameters. For example only, the adjustment assessment module 632 may monitor measured current, such as a mean current, a mean squared current, or a root mean squared current. For example only, the measured current may be the Iqdr Actual value received from the abc to qdr module 520.

The adjustment assessment module 632 may consider a decrease in the measured current as being an improvement and generate the improvement signal correspondingly. However, the adjustment assessment module 632 may also monitor the OOV signal. If the OOV signal indicates that the motor 400 is operating unacceptably out of volts, the adjustment assessment module 632 may consider this condition not to represent an improvement.

In various implementations, some amount of OOV operation may be acceptable, such as 5 percent. If the OOV signal increases above this threshold, motor performance may suffer. Therefore, the adjustment assessment module 632 may consider a change in the $Idr_{Adjust}$ value that causes the OOV signal to exceed the threshold to not be an improvement.

If the previous value of the OOV signal was above the threshold and the change in the $Idr_{Adjust}$ value decreases the OOV signal, the adjustment assessment module 632 may consider the change to be an improvement. If the previous OOV signal was not greater than the threshold, but the present OOV signal is above the threshold, the adjustment assessment module 632 may consider the change to not be an improvement.

If the previous OOV signal was not greater than the threshold and the present OOV signal is still not greater than the threshold, the adjustment assessment module 632 may determine that an improvement has been made when the measured current has been reduced compared to a previous value of the measured current. Conversely, if the present value of the measured current is greater than the previous value of the measured current, the adjustment assessment module 632 may determine that no improvement was made.

The Idr adjustment module 608 may store values of the $Idr_{Adjust}$ value that yielded a desired level of improvement. In various implementations, the Idr adjustment module 608 may reset the $Idr_{Adjust}$ value to a corresponding one of the stored values instead of to zero. If the stored value quickly creates one or more reset conditions, the Idr adjustment module 608 may then reset the $Idr_{Adjust}$ value to zero. In various implementations, the Idr adjustment module 608 may update the Idr base module 604 with desirable values of the $Idr_{Adjust}$ value. For example only, the Idr adjustment module 608 may update a stored $Idr_{Base}$ value associated with the current operating conditions to a sum of the stored $Idr_{Base}$ value and a desired $Idr_{Adjust}$ value. These updates may be cleared and the Idr base module 604 reverted to values set at design time, for example, based on a hardware or software memory reset signal.

Figure 7:
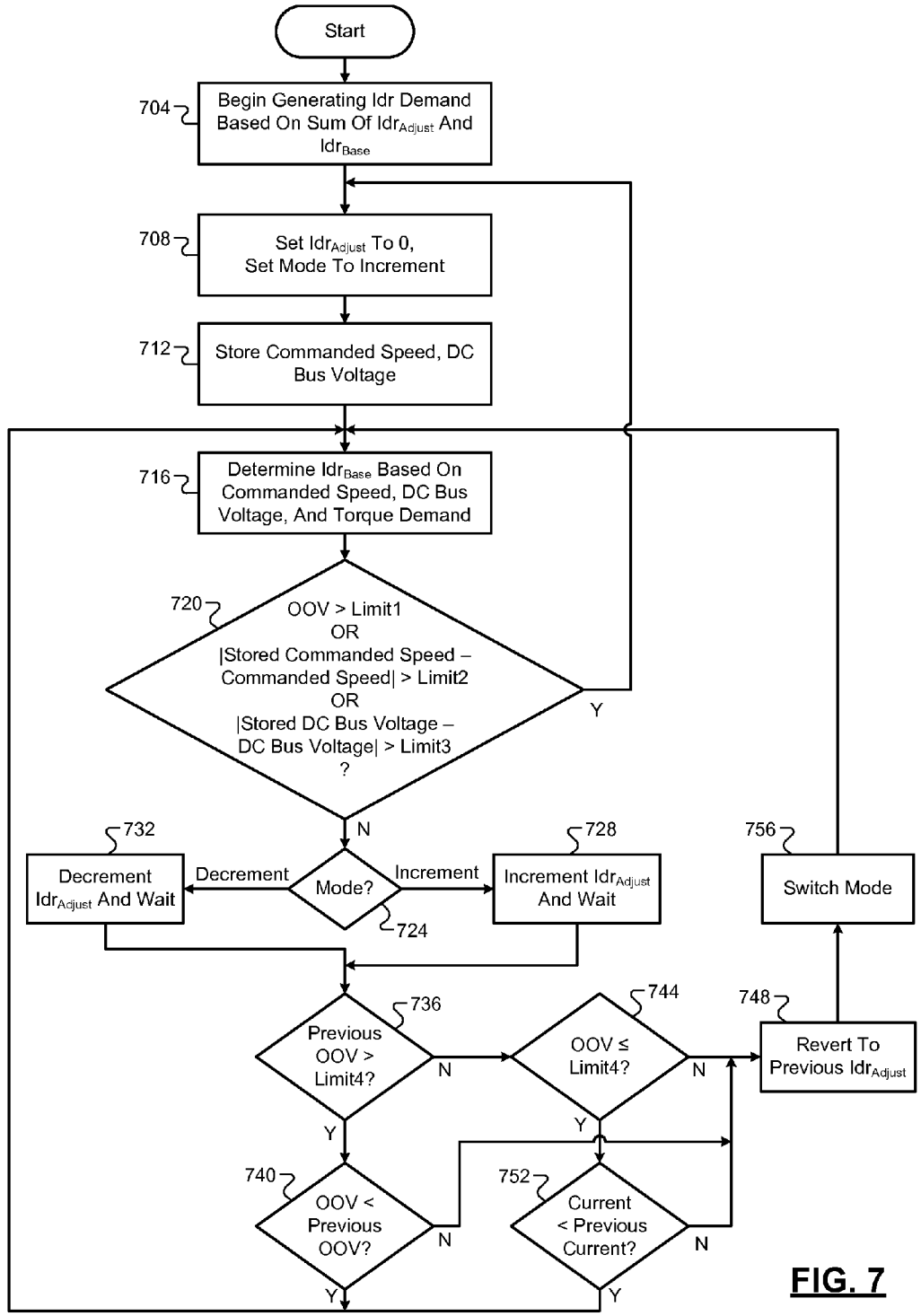
FIG. 7 illustrates a method of optimizing motor operation according to the present disclosure.

Referring now to FIG. 7, a flowchart depicts an example of control of an Idr injection system. Control begins at 704, where control begins generating the Idr demand based on a sum of the $Idr_{Adjust}$ and $Idr_{Base}$ values. Control continues in 708, where control resets the $Idr_{Adjust}$ value to 0 and sets a mode flag to an increment mode. Control continues at 712, where control stores present values of the commanded speed and the DC bus voltage.

Control continues at 716, where control determines the $Idr_{Base}$ value based on the commanded speed, DC bus voltage, and demanded torque. For example only, control may determine $Idr_{Base}$ using a two-dimensional look-up table with one index being the demanded torque and the other index being the commanded speed divided by the DC bus voltage.

Control continues at 720, where control checks for reset conditions. If one or more of the reset conditions are present, control returns to 708; otherwise, control transfers to 724. The reset conditions include the OOV signal being greater than a first predetermined limit. The reset conditions may also include the absolute value of the difference between the stored value of the commanded speed and a present value of the commanded speed being greater than a second predetermined limit. The reset conditions may also include the absolute value of the difference between the stored DC bus voltage and the present value of the DC bus voltage being greater than a third predetermined limit.

At 724, control transfers to 728 when the mode flag is set to the increment mode, and control transfers to 732 when the mode flag is set to a decrement mode. At 728, control increments the $Idr_{Adjust}$ value and waits. For example only, the wait may be for a predetermined period of time whose length is determined by an expected time after which an improvement should be realized due to the change in the $Idr_{Adjust}$ value. In addition, when the value of the Idr demand is being filtered, the predetermined period of time may be set to account for the change in the $Idr_{Adjust}$ value propagating through the filter. Control continues from 728 at 736.

In various implementations, an upper limit may be applied to the $Idr_{Adjust}$ value. If the upper limit is reached at 728, control may change the mode flag to the decrement mode and return to 716. Alternatively, if the $Idr_{Adjust}$ value reaches the upper limit, control may return to 708 to reset the $Idr_{Adjust}$ value.

At 732, control decrements the $Idr_{Adjust}$ value and waits. For example only, control may wait for a predetermined period of time, which may be equal to the predetermined period of time used at 728. Control continues from 732 at 736. In various implementations, control may apply a lower limit to the $Idr_{Adjust}$ value. If decrementing decreases the $Idr_{Adjust}$ value below the lower limit, control may change the mode flag to the increment mode and return to 716. Alternatively, when the $Idr_{Adjust}$ value falls below the lower limit, control may return to 708 to reset the $Idr_{Adjust}$ value.

At 736, control checks whether a previous value of the OOV signal is greater than a fourth predetermined limit. If so, control transfers to 740; otherwise, control transfers to 744. The fourth predetermined limit is less than the first predetermined limit. At 740, control determines whether the present value of the OOV signal is less than the previous value of the OOV signal. If so, an improvement has been realized because the OOV signal has decreased, and control returns to 716. Otherwise, control transfers to 748, where control reverts the $Idr_{Adjust}$ value to the previous $Idr_{Adjust}$ value.

At 744, control determines whether the present value of the OOV signal is less than or equal to the fourth predetermined limit. If so, control transfers to 752; otherwise, the OOV signal is now above the threshold, which is not an improvement, and control transfers to 748.

At 752, control determines whether a present value of the measured current is less than a previous value of the measured current. If so, an improvement has been realized because the measured current has decreased, and control returns to 716. Otherwise, no improvement has been realized, and control transfers to 748. At 748, after reverting to the previous $Idr_{Adjust}$ value, control continues at 756. At 756, control switches the mode flag and returns to 716. Switching the mode flag means that if the mode is currently the increment mode, control switches to the decrement mode, and vice versa.

Figure 8:
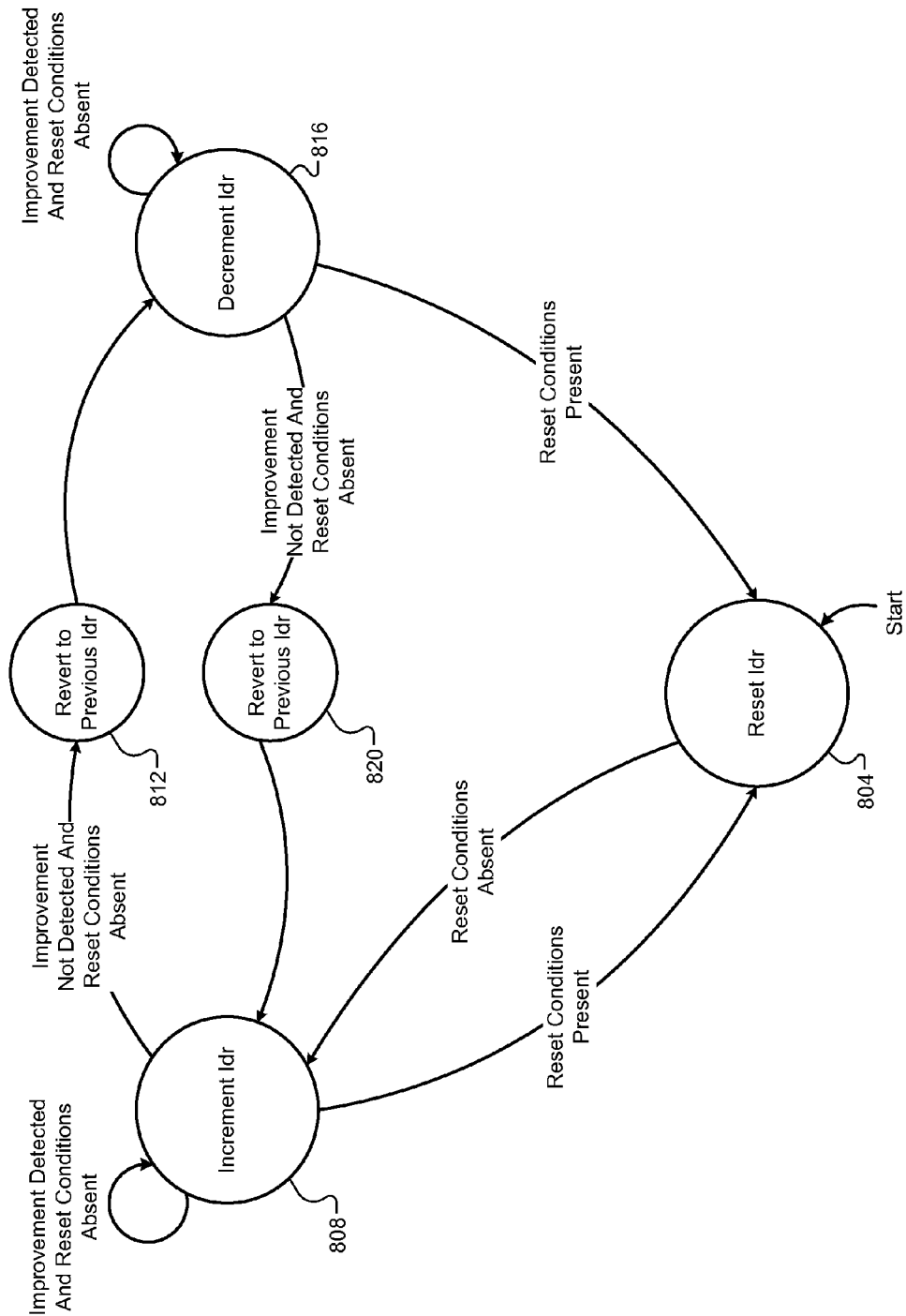
FIG. 8 illustrates a state flow diagram that describes an Idr correction system according to the present disclosure.

Referring now to FIG. 8, a state diagram describes an Idr correction system. The starting state is 804, in which the Idr correction system is reset. For example only, the Idr correction system may be reset by setting the Idr demand to a value obtained from a look-up table based on the commanded motor speed, the torque demand, and the DC bus voltage. In various implementations, the Idr demand may alternatively or additionally be determined based on the estimated speed.

The Idr correction system transitions from state 804 to state 808 when reset conditions are absent. In state 808, the Idr correction system increments the Idr demand. The Idr correction system transitions back to state 804 when one or more of the reset conditions are present. When the reset conditions are absent, the Idr correction system remains in state 808 if the increment of the Idr demand is determined to be an improvement. If the reset conditions are absent, and the increment is not determined to be an improvement, the Idr correction system transitions to state 812. In state 812, the Idr demand is reverted to the previous value of the Idr demand. The Idr correction system then transitions to state 816.

In state 816, the Idr correction system decrements the Idr demand. The Idr correction system transitions to state 804 when one or more of the reset conditions are present. When the reset conditions are absent, the Idr correction system remains in state 816 if the decrement to the Idr demand is determined to be an improvement. If the reset conditions are absent, and the decrement is not determined to be an improvement, the Idr correction system transitions to state 820. In state 820, the Idr correction system reverts the Idr demand to its previous value and transitions back to state 808.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
a current control module that generates a voltage request based on a d-axis current (Idr) demand;
a switching control module that controls a motor based on the voltage request and that generates an out-of-volts (OOV) signal based on a comparison of the voltage request and an available voltage; and
an Idr injection module that:
generates the Idr demand based on a direct current (DC) bus voltage, a rotational speed, and a demanded torque;
selectively applies a first adjustment to the Idr demand;
identifies whether an improvement resulted from the first adjustment, wherein the improvement is identified when a measured current of the motor after the first adjustment is less than a measured current of the motor before the first adjustment; and
selectively applies a second adjustment to the Idr demand based on whether the improvement is identified.

2. The system of claim 1 wherein the improvement is identified when the OOV signal before the first adjustment is greater than a predetermined limit and the OOV signal after the first adjustment is less than the OOV signal before the first adjustment.

3. The system of claim 2 wherein the improvement is identified when all of the following are true: (i) the OOV signal before the first adjustment is less than the predetermined limit, (ii) the OOV signal after the first adjustment is less than predetermined limit, and (iii) the measured current after the first adjustment is less than the measured current before the first adjustment.

4. The system of claim 1 wherein the Idr injection module:
determines a base demand;
selectively modifies an adjust value by applying the first and second adjustments; and
generates the Idr demand by adding the adjust value to the base demand.

5. The system of claim 4 wherein the Idr injection module determines the base demand from a lookup table based on the DC bus voltage, the rotational speed, and the demanded torque, and wherein the rotational speed is a commanded speed of the motor.

6. The system of claim 4 wherein:
when reset conditions are present, the Idr injection module resets the adjust value to zero, stores the rotational speed, and stores the DC bus voltage; and
the reset conditions include at least one of:
the OOV signal is greater than a first predetermined value,
a magnitude of a difference between the rotational speed and the stored value of the rotational speed is greater than a second predetermined value, and
a magnitude of a difference between the DC bus voltage and the stored value of the DC bus voltage is greater than a third predetermined value.

7. The system of claim 1 wherein the switching control module:
sets an OOV flag to a first value when the voltage request is greater than an upper limit based on the available voltage;
sets the OOV flag to a second value when the voltage request is less than the upper limit; and
generates the OOV signal based on an average of the OOV flag.

8. A system comprising:
a current control module that generates a voltage request based on a d-axis current (Idr) demand;
a switching control module that controls a motor based on the voltage request and that generates an out-of-volts (OOV) signal based on a comparison of the voltage request and an available voltage; and
an Idr injection module that:
generates the Idr demand based on a direct current (DC) bus voltage, a rotational speed, and a demanded torque;
selectively applies a first adjustment to the Idr demand;
identifies whether an improvement resulted from the first adjustment, wherein the improvement is identified based on at least one of (i) a measured current of the motor and (ii) the OOV signal; and
selectively applies a second adjustment to the Idr demand based on whether the improvement is identified,
wherein:
when the improvement is identified, the Idr injection module applies the second adjustment in a same direction as the first adjustment; and
when the improvement is not identified, the Idr injection module applies the second adjustment in an opposite direction of the first adjustment.

9. The system of claim 8 wherein when the improvement is not identified, the Idr injection module removes the first adjustment before applying the second adjustment.

10. A method comprising:
generating a d-axis current (Idr) demand based on a direct current (DC) bus voltage, a rotational speed, and a demanded torque;
generating a voltage request based on the Idr demand;
generating an out-of-volts (OOV) signal based on a comparison of the voltage request and an available voltage;
controlling a motor based on the voltage request;
selectively applying a first adjustment to the Idr demand;
identifying whether an improvement resulted from the first adjustment, wherein the improvement is identified when a measured current of the motor after the first adjustment is less than a measured current of the motor before the first adjustment; and
selectively applying a second adjustment to the Idr demand based on whether the improvement is identified.

11. The method of claim 10 wherein the improvement is identified when the OOV signal before the first adjustment is greater than a predetermined limit and the OOV signal after the first adjustment is less than the OOV signal before the first adjustment.

12. The method of claim 11 wherein the improvement is identified when all of the following are true: (i) the OOV signal before the first adjustment is less than the predetermined limit, (ii) the OOV signal after the first adjustment is less than predetermined limit, and (iii) the measured current after the first adjustment is less than the measured current before the first adjustment.

13. The method of claim 10 further comprising:
determining a base demand;
selectively modifying an adjust value by applying the first and second adjustments; and
generating the Idr demand by adding the adjust value to the base demand.

14. The method of claim 13 further comprising determining the base demand from a lookup table based on the DC bus voltage, the rotational speed, and the demanded torque, and wherein the rotational speed is a commanded speed of the motor.

15. The method of claim 13 further comprising:
when reset conditions are present, resetting the adjust value to zero, storing the rotational speed, and storing the DC bus voltage; and
wherein the reset conditions include at least one of:
the OOV signal is greater than a first predetermined value,
a magnitude of a difference between the rotational speed and the stored value of the rotational speed is greater than a second predetermined value, and
a magnitude of a difference between the DC bus voltage and the stored value of the DC bus voltage is greater than a third predetermined value.

16. The method of claim 10 further comprising:
setting an OOV flag to a first value when the voltage request is greater than an upper limit based on the available voltage;
setting the OOV flag to a second value when the voltage request is less than the upper limit; and
generating the OOV signal based on an average of the OOV flag.

17. A method comprising:
generating a d-axis current (Idr) demand based on a direct current (DC) bus voltage, a rotational speed, and a demanded torque;
generating a voltage request based on the Idr demand;
generating an out-of-volts (OOV) signal based on a comparison of the voltage request and an available voltage;
controlling a motor based on the voltage request;
selectively applying a first adjustment to the Idr demand;
identifying whether an improvement resulted from the first adjustment, wherein the improvement is identified based on at least one of (i) a measured current of the motor and (ii) the OOV signal;
selectively applying a second adjustment to the Idr demand based on whether the improvement is identified;
when the improvement is identified, applying the second adjustment in a same direction as the first adjustment; and
when the improvement is not identified, applying the second adjustment in an opposite direction of the first adjustment.

18. A method of controlling a motor, the method comprising:
determining a base demand from a lookup table based on a direct current (DC) bus voltage, a commanded speed, and a demanded torque;
generating a d-axis current (Idr) demand by adding an adjust value to the base demand;
generating a voltage request based on the Idr demand;
setting an out-of-volts (OOV) flag to a first value when the voltage request is greater than an upper limit, wherein the upper limit is based on the DC bus voltage;
setting the OOV flag to a second value when the voltage request is less than the upper limit;
generating an OOV signal by averaging the OOV flag;
controlling a motor based on the voltage request;
selectively applying a first adjustment to the adjust value;
identifying whether an improvement resulted from the first adjustment, wherein the improvement is identified when at least one of:
both of the following are true: (i) the OOV signal before the first adjustment is greater than a predetermined limit and (ii) the OOV signal after the first adjustment is less than the OOV signal before the first adjustment; or
all of the following are true: (i) the OOV signal before the first adjustment is less than the predetermined limit, (ii) the OOV signal after the first adjustment is less than predetermined limit, and (iii) a measured current after the first adjustment is less than the measured current before the first adjustment;
when the improvement is identified, applying a second adjustment to the adjust value in a same direction as the first adjustment;
when the improvement is not identified, applying the second adjustment to the adjust value in an opposite direction of the first adjustment; and
when reset conditions are present, resetting the adjust value to zero, storing the commanded speed, and storing the DC bus voltage,
wherein the reset conditions include at least one of:
the OOV signal is greater than a first predetermined value,
a magnitude of a difference between the commanded speed and the stored value of the commanded speed is greater than a second predetermined value, and
a magnitude of a difference between the DC bus voltage and the stored value of the DC bus voltage is greater than a third predetermined value.

* * * * *

UNITED STATES PATENT AND TRADEMARK OFFICE
CERTIFICATE OF CORRECTION

| | | |
|---|---|---|
| PATENT NO. | : 8,698,433 B2 | Page 1 of 1 |
| APPLICATION NO. | : 12/852619 | |
| DATED | : April 15, 2014 | |
| INVENTOR(S) | : Charles E. Green | |

It is certified that error appears in the above-identified patent and that said Letters Patent is hereby corrected as shown below:

In the Specification

| | |
|---|---|
| Column 12, Line 8 | Delete "1a, 1b, and 1c," and insert --Ia, Ib, and Ic,--. |
| Column 12, Line 63 | Delete "$V_a$," and insert --$V_{a-c}$--. |
| Column 13, Line 16 | Delete "$I_{a-c}$," and insert --$I_{a-c}$--. |
| Column 14, Line 10 | Delete "$\lambda_v$" and insert --$\theta_v$--. |
| Column 14, Line 12 | Delete "$\theta_V$" and insert --$\theta_v$--. |
| Column 16, Line 12 | Delete "lqr" and insert --Iqr--. |
| Column 17, Line 27 | After "522.", delete "¶". |
| Column 19, Line 32 | Delete "$Idr_{base}$" and insert --$Idr_{Base}$--. |

Signed and Sealed this
Fourteenth Day of July, 2015

Michelle K. Lee
*Director of the United States Patent and Trademark Office*